(12) United States Patent
Li et al.

(10) Patent No.: US 12,114,318 B2
(45) Date of Patent: Oct. 8, 2024

(54) DOWNLINK MONITORING AND TRANSMISSION METHODS AND DEVICES, COMMUNICATION SYSTEM, TERMINAL AND BASE STATION

(71) Applicant: ZTE Corporation, Shenzhen (CN)

(72) Inventors: Xincai Li, Shenzhen (CN); Yajun Zhao, Shenzhen (CN); Hanqing Xu, Shenzhen (CN); Ling Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 838 days.

(21) Appl. No.: 17/262,889

(22) PCT Filed: Jul. 15, 2019

(86) PCT No.: PCT/CN2019/096022
§ 371 (c)(1),
(2) Date: Jan. 25, 2021

(87) PCT Pub. No.: WO2020/020006
PCT Pub. Date: Jan. 30, 2020

(65) Prior Publication Data
US 2021/0168780 A1 Jun. 3, 2021

(30) Foreign Application Priority Data
Jul. 25, 2018 (CN) .......................... 201810825221.0

(51) Int. Cl.
*H04W 72/04* (2023.01)
*H04W 72/0446* (2023.01)
(Continued)

(52) U.S. Cl.
CPC ....... *H04W 72/23* (2023.01); *H04W 72/0446* (2013.01); *H04W 72/0453* (2013.01)

(58) Field of Classification Search
CPC ............. H04W 72/23; H04W 72/0446; H04W 72/0453; H04W 72/044; H04W 72/1273; H04W 74/0808; H04L 5/0053
See application file for complete search history.

(56) References Cited

U.S. PATENT DOCUMENTS

2018/0049168 A1  2/2018  Ryu et al.

FOREIGN PATENT DOCUMENTS

CN  107612643 A  1/2018

OTHER PUBLICATIONS

"Frame structure for NR-U operation," 3GPP TSG RAN WG1 Meeting #93, Korea, May 21-25, 2018, R1-1806105; (cited as entry #1 of NPL in IDS filed on Feb. 2, 2021) (Year: 2018).*

(Continued)

*Primary Examiner* — Jamal Javaid
(74) *Attorney, Agent, or Firm* — CANTOR COLBURN LLP

(57) ABSTRACT

Provided by embodiments of the present disclosure are downlink monitoring and transmission methods and devices, a communication system, a terminal and a base station. The terminal has two different monitoring opportunity strategies for slots in a channel occupancy term (COT). The terminal can switch the monitoring opportunity strategy for downlink monitoring from a first monitoring opportunity strategy to a second monitoring opportunity strategy according to a switching triggered received from a base station.

19 Claims, 4 Drawing Sheets

(51) Int. Cl.
*H04W 72/0453* (2023.01)
*H04W 72/23* (2023.01)

(56) References Cited

OTHER PUBLICATIONS

International Search Report for corresponding application PCT/CN2019/096022 filed Jul. 15, 2019; Mail date Sep. 26, 2019.
Nokia, Nokia Shanghai Bell, "Frame structure for NR-U operation", 3GPP TSG RAN WG1 Meeting #93, Busan, Korea, May 21-25, 2018, R1-1806105.
Nokia, Nokia Shanghai Bell, "On DL Signals and Channels for NR-U", 3GPP TSG RAN WG1 Meeting #93, Busan, Korea, May 21-25, 2018, R1-1806106.
ZTE, Sanechips, "Considerations on DL reference signals and channels design for NR-U", 3GPP TSG RAN WG1 Meeting #96bis, Xi'an, China, Apr. 8-12, 2019, R1-1903871.
European Search Report for corresponding application EP19840564; Report dated Aug. 31, 2021.
Guangdong OPPO Mobile Telecom, "DL control channel design for URLLC", 3GPP TSG RAN WG1 Meeting #90, Prague Aug. 2017; R1-1713260.

* cited by examiner

DOWNLINK MONITORING AND TRANSMISSION METHODS AND DEVICES, COMMUNICATION SYSTEM, TERMINAL AND BASE STATION

CROSS REFERENCE

This application is a National Stage Filing of the PCT International Application No. PCT/CN2019/096022 filed on Jul. 15, 2019, which claims the priority to Chinese Application No. 201810825221.0 filed before the China National Intellectual Property Administration (CNIPA) on Jul. 25, 2018, the entirety of which is herein incorporated by reference.

TECHNICAL FIELD

The present disclosure relates to the communication field, and in particular to downlink monitoring and transmission methods and devices, a communication system, a terminal and a base station.

BACKGROUND

In new radio (NR), a base station needs to semi-statically configure, for a terminal through higher layer signaling, time-frequency positions on which Physical Downlink Control Channel (PDCCH) monitoring is to be performed, namely, the base station needs to configure a PDCCH monitoring opportunity strategy for the terminal. Once the base station completes the configuration of the PDCCH monitoring opportunity strategy, the terminal needs to perform PDCCH monitoring at the designated time-domain position and frequency-domain position according to the configuration. For example, the base station indicates the terminal to perform PDCCH monitoring on each symbol whose sequence number is a multiple of 3 within a monitoring period by taking m slots as the monitoring period. The terminal can only perform the PDCCH monitoring according to the specified manner in the subsequent process. If the monitoring granularity of the configured PDCCH monitoring opportunity strategy is too fine (i.e., too small), the monitoring frequency of the terminal will be relatively high, which will increase the complexity and power consumption of the terminal for the PDCCH monitoring. If the monitoring granularity of the configured PDCCH monitoring opportunity strategy is too coarse (i.e., too large), the opportunity of performing downlink transmission by the base station will be reduced, which will cause the base station to wait a long time to get the transmission opportunity when the base station has downlink information to be transmitted.

SUMMARY

Provided in the embodiments of the present disclosure are downlink monitoring and transmission methods and devices, a communication system, a terminal and a base station, which can solve the following technical problem: since a terminal can only perform PDCCH blind monitoring according to a unified monitoring opportunity strategy configured by a base station, if the configured monitoring granularity is too coarse, great downlink transmission time delay of the base station will be caused, or if the configured monitoring granularity is too fine, large monitoring workload and high power consumption of the terminal will be caused.

In order to solve the above technical problem, the embodiments of the present disclosure provide a downlink monitoring method including the following operations.

It is determined that a current slot is a target slot in a channel occupancy term (COT).

Downlink monitoring is performed according to a target monitoring opportunity strategy corresponding to the target slot. The monitoring granularity of the target monitoring opportunity strategy is smaller than a monitoring granularity of a common monitoring opportunity strategy. The common monitoring opportunity strategy is a monitoring opportunity strategy of other slots except for the target slot in the COT.

The embodiments of the present disclosure provide a downlink transmission method including the following operations.

It is determined that there is a demand for transmitting downlink information to a terminal in a target slot of a COT.

A transmission starting time-frequency position of the downlink information is determined based on a target monitoring opportunity strategy corresponding to the target slot. The target monitoring opportunity strategy is used to indicate downlink monitoring of the terminal, and a monitoring granularity of the target monitoring opportunity strategy is smaller than a monitoring granularity of a common monitoring opportunity strategy except for the target slot in the COT.

The downlink information is transmitted to the terminal at the transmission starting time-frequency position.

The embodiments of the present disclosure provide a downlink monitoring device, including:

a slot determination module, which is configured to determine that a current slot is a target slot in a channel occupancy term (COT);

an information monitoring module, which is configured to perform downlink monitoring according to a target monitoring opportunity strategy corresponding to the target slot, wherein a monitoring granularity of the target monitoring opportunity strategy is smaller than a monitoring granularity of a common monitoring opportunity strategy. The common monitoring opportunity strategy is a monitoring opportunity strategy of other slots except for the target slot in the COT.

The embodiments of the present disclosure provide a downlink monitoring device, including:

a transmission and determination module, which is configured to determine that there is a demand for transmitting downlink information to the terminal in a target slot of a COT;

a position determination module, which is configured to determine a transmission starting time-frequency position of the downlink information based on a target monitoring opportunity strategy corresponding to the target slot, wherein the target monitoring opportunity strategy is used to indicate downlink monitoring of the terminal, and a monitoring granularity of the target monitoring opportunity strategy is smaller than a monitoring granularity of a common monitoring opportunity strategy except for the target slot in the COT; and an information transmission module, which is configured to transmit the downlink information to the terminal at the transmission starting time-frequency position.

The embodiments of the present disclosure provide a terminal, including a first processor, a first memory and a first communication bus. The first communication bus is configured to implement connection and communication between the first processor and the first memory.

The first processor is configured to execute one or more programs stored in the first memory to implement the operations of the above downlink monitoring method.

The embodiments of the present disclosure provide a base station, including a second processor, a second memory and a second communication bus. The second communication bus is configured to implement connection and communication between the second processor and the second memory.

The second processor is configured to execute one or more programs stored in the second memory to implement the operations of the above downlink transmission method.

The embodiments of the present disclosure provide a communication system, including the above terminal and the above base station.

The embodiments of the present disclosure provide a storage medium, in which at least one of a downlink monitoring program and a downlink transmission program is stored. The downlink monitoring program can be executed by one or more processors to implement the operations of the above downlink monitoring method. The downlink transmission program can be executed by one or more processors to implement the operations of the above downlink transmission method.

The beneficial effects of the embodiments of the present disclosure are as follows.

According to the monitoring and transmission methods and devices as well as the system, the terminal, the base station and the storage medium provided by the embodiments of the present disclosure, when a base station determines that downlink information needs to be transmitted to a terminal in a target slot of a COT, a transmission starting time-frequency position of the downlink information can be determined based on a target monitoring opportunity strategy corresponding to the target slot; and then the downlink information is transmitted to the terminal at the determined time-frequency position. The terminal can perform the downlink monitoring according to the target monitoring opportunity strategy in the target slot, so the downlink information transmitted by the base station can be monitored by the terminal. In the embodiments of the present disclosure, the terminal has two different monitoring opportunity strategies for slots in the COT, the terminal can use a common monitoring opportunity strategy for monitoring a common slot in the COT, and use a target monitoring opportunity strategy for monitoring a target slot in the COT. The monitoring granularity of the target monitoring opportunity strategy is smaller than the monitoring granularity of the common monitoring opportunity strategy, that is, the monitoring density for the target slot is larger, so the base station has relatively dense transmission opportunities in the target slot. When downlink transmission is required, the transmission opportunity can be obtained without waiting for a long time, and the downlink information can be transmitted at the corresponding time-frequency position. For other slots in the COT, the monitoring granularity of the terminal is large and the monitoring density is small, so that the monitoring workload of the terminal is relatively small, which is beneficial to reducing the power consumption of the downlink monitoring on the terminal.

Other features and corresponding beneficial effects of the embodiments of the present disclosure are described in the following part of the specification. It should be understood that at least part of the beneficial effects will become apparent from the description in the specification of the present disclosure.

DETAILED DESCRIPTION OF THE EMBODIMENTS

Figure 1:
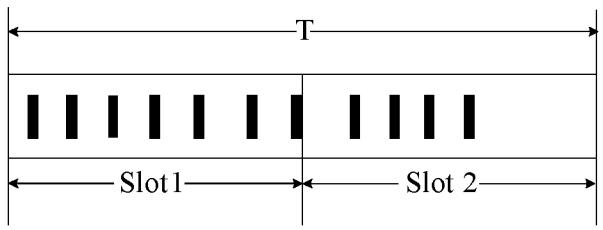
FIG. 1 is a schematic diagram of a total number of symbols and an actual number of monitored symbols in a monitoring period in an embodiment 1 of the present disclosure.

In order to make the purposes, technical solutions and advantages of the present disclosure clearer, the embodiments of the present disclosure are described in detail through exemplary implementations in conjunction with accompanying drawings. It should be understood that the exemplary embodiments described herein are only used to explain the present disclosure, but not to limit the present disclosure.

Embodiment 1

With an explosive growth of communication demands, spectrum resources are increasingly scarce. To meet demands in an exponential growth trend, extra spectrum resources need to be increased. Due to limited authorized spectrum resources, a communication provider needs to search unauthorized spectrum resources, i.e., the authorized spectrum resources, for solving problems. Compared with authorized carriers, unauthorized carriers have advantages of free/low cost, low access requirements, resource sharing, more wireless access technologies and more sites. Currently, a project research on the transmission operation of the unauthorized carriers has been conducted in a 3rd Generation Partnership Project (3GPP) technology.

Generally, before performing transmission by using the unauthorized carriers, communication equipment needs to perform Listen Before Talk (LBT). LBT is also called listen before talk, or Clear Channel Assessment (CCA). LBT processing refers to a process of listening on a carrier to be used for service transmission and determining whether the carrier is free and available. Only when the LBT processing result is positive (i.e., LBT success), the equipment can start a channel occupancy term (COT), and transmit data in the COT using the unauthorized carriers.

For downlink transmission, a base station will transmit downlink information after LBT success. A terminal cannot accurately determine the specific time and frequency band on which the base station will perform the downlink information transmission. The terminal can only perform monitoring according to a monitoring opportunity strategy configured by the base station via higher layer signaling in advance. For the base station, since a time-frequency position at which the terminal starts downlink monitoring (namely, a monitoring starting position) is known, the time-frequency position at which the base station starts to transmit the downlink information (namely, the transmission starting time-frequency position) is also known.

The monitoring opportunity strategy for downlink monitoring at the terminal side is semi-statically configured by the base station in advance via higher layer signaling, for example, the base station indicate the monitoring opportunity strategy to the terminal via two (Information Entity) IEs which are respectively a control resource set (CORESET) parameter and a search space parameter. The search space parameter may indicate a to-be-monitored time-domain position. A monitoring Slot Periodicity And Offset parameter and a monitoring Symbols Within Slot parameter are included in the search space parameter. Through the two parameters, the base station can indicate the terminal how many slots are contained in one monitoring period and on which symbols in which slot of the monitoring period the terminal needs to perform the downlink monitoring. The CORESET parameter may indicate a to-be-monitored frequency-domain position and a length of downlink control information. It can be concluded from the above content that a monitoring granularity of the monitoring opportunity strategy is fixed, and a corresponding transmission opportunity granularity for the downlink transmission at the base station is also fixed. The base station and the terminal respectively perform downlink transmission and downlink monitoring according to the fixed granularity. In a related technology, the size of the monitoring granularity of the monitoring opportunity strategy configured by the base station is irrelevant to whether the base station starts the COT, and also irrelevant to various slots in the COT.

It can be understood that, if the monitoring granularity configured by the base station is too fine, for example, if the base station triggers the terminal to perform PDCCH monitoring on each symbol of each slot within the monitoring period, the base station can transmit the downlink information in the shortest time after the LBT is successfully executed. However, from the perspective of the terminal, the monitoring complexity, the monitoring workload and the power consumption will be extremely high. But if the monitoring granularity configured by the base station is too coarse, for example, if the base station indicates the terminal that two slots are contained in one monitoring period, and downlink monitoring is performed only on the last symbol in the second slot within this monitoring period, then the burden of downlink monitoring on the terminal is indeed relatively small. However, this configuration is very unfavorable for the downlink transmission of the base station, if the moment when the base station performs LBT successfully is at a starting position of the monitoring period, the base station has to wait for almost two slots to get a transmission opportunity, and downlink transmission efficiency will be greatly affected.

In view of this, this embodiment provides a downlink monitoring method. The downlink monitoring method is applied to a terminal side and is executed by a terminal.

In this embodiment, the terminal does not perform the downlink monitoring only according to the monitoring opportunity strategy, which is semi-statically configured by the base station and is unrelated to the slots in the COT. The granularity for the downlink monitoring of the terminal is related to the slots in the COT. The slots in one COT may be divided into one or more target slots and one or more common slots. For a target slot, the terminal can perform the downlink monitoring according to a target monitoring opportunity strategy. For other slots except for the target slot in the COT, the terminal can perform the downlink monitoring according to a common monitoring opportunity strategy. A monitoring granularity of the target monitoring opportunity strategy is smaller than a monitoring granularity of the common monitoring opportunity strategy. Therefore, when the terminal performs the downlink monitoring according to the target monitoring opportunity strategy, monitoring density is relatively high; and when the terminal performs the downlink monitoring according to the common monitoring opportunity strategy, the monitoring density is relatively low. It can be understood that, the smaller the monitoring granularity, the higher the corresponding monitoring density (which means that the monitoring intensity is higher, and the downlink monitoring is finer); likewise, the larger the monitoring granularity, the lower the corresponding monitoring density (which means that the monitoring intensity is lower, and the downlink monitoring is rougher). Therefore, in this embodiment, the terminal performs more and finer downlink monitoring on the target slot in the COT, while performs less monitoring on the common slot. Correspondingly, the base station has relatively dense downlink transmission opportunities in the target slot of the COT, while has relatively sparse downlink transmission opportunities in the common slot.

For example, the above target monitoring opportunity strategy corresponding to the target slot includes but is not limited to: monitoring even-numbered symbols in the target slot, or monitoring odd-numbered symbols in the target slot, or monitoring symbols with sequence numbers such as 0, 2, 4 and 7 in the target slot. The above common monitoring opportunity strategy corresponding to the common slot includes but is not limited to: monitoring the first symbol of each common slot, or monitoring the symbols with sequence numbers 0 and 7 in each common slot, or monitoring once every two common slots.

The monitoring granularity may include a time-domain monitoring granularity and a frequency-domain monitoring granularity. In this embodiment, the monitoring granularity of the target monitoring opportunity strategy is smaller than the monitoring granularity of the common monitoring opportunity strategy. This condition can be satisfied in the following cases: the time-domain monitoring granularity of the target monitoring opportunity strategy is smaller than the time-domain monitoring granularity of the common monitoring opportunity strategy; or the frequency-domain monitoring granularity of the target monitoring opportunity strategy is smaller than the frequency-domain monitoring granularity of the common monitoring opportunity strategy; or the time-domain monitoring granularity and the frequency-domain monitoring granularity of the target monitoring opportunity strategy are respectively smaller than the time-domain monitoring granularity and the frequency-domain monitoring granularity corresponding to the common monitoring opportunity strategy.

In one example, the time-domain monitoring granularity refers to a ratio of a total symbol number to an actual number of monitored symbols, wherein the total symbol number refers to the number of all remaining symbols within the monitoring period when the PDCCH monitoring is started in the monitoring period. As shown in FIG. 1, the monitoring period T includes two slots. According to general understanding, the monitoring period includes 28 symbols in total. The symbols to be monitored include all symbols with odd-numbered sequence number in the first slot (slot 1) (assuming that the sequence numbers of the symbols in the slot start from 0 in this embodiment) and the symbols with sequence numbers of 2, 4, 6 and 8 in the second slot (slot 2). Therefore, the terminal will actually perform downlink monitoring on 18 symbols, which means that the monitoring granularity is 28/18, namely, 14/9. It can be understood that the slots included in the monitoring period are not necessarily all complete slots. For example, in an example of this embodiment, when the terminal determines to enter the target slot, half of the target slot may have passed. In this case, the total symbol number in the monitoring period is 7.

Similar to the time-domain monitoring granularity, the frequency-domain monitoring granularity is a ratio of a total frequency band value to an actual monitored frequency band value. The total frequency band value is the sum of the frequency band values of all candidate frequency bands for the downlink transmission. By taking that the base station configures three Bandwidth Parts (BWP) for the terminal as an example, since the base station can use at least one of BWP1, BWP2, and BWP3 to transmit the downlink information to the terminal, the total frequency band value is the sum of the three BWP frequency bands. Herein the total frequency band value is assumed as 80 MHz. It can be understood that the terminal does not always perform the downlink monitoring at all frequency positions in the three BWPs. Assuming that the terminal performs the downlink monitoring within the monitoring period for 20 MHz in the BWP1 and 20 MHz in the BWP2, the actual monitored frequency band value is 40 MHz, so the frequency-domain monitoring granularity is 80/40, i.e., 2.

Figure 2:
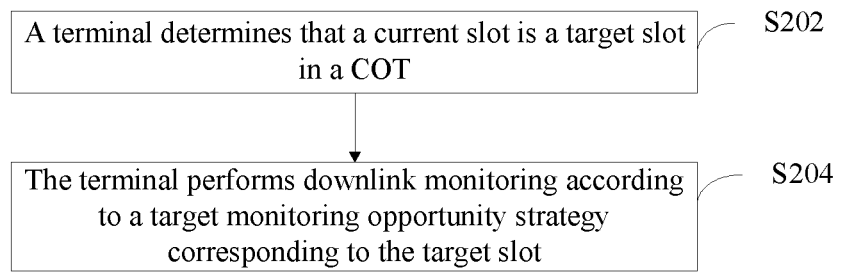
FIG. 2 is a flow chart of a downlink monitoring method provided in embodiment 1 of the prevent disclosure.

As shown in FIG. 2 which is a flow chart of a downlink monitoring method, the downlink monitoring method includes the following operations S202 and S204.

At S202, a terminal determines that a current slot is a target slot in a COT.

It can be understood that when the terminal performs the downlink monitoring according to the target monitoring opportunity strategy, finer downlink monitoring can be performed on the corresponding target slot, and thus denser downlink transmission opportunities can be provided to the base station. Therefore, in this embodiment, the target slot (or target slots) refers to one or more slots, on which the base station has intensive downlink transmission demands, in the COT. The one or more slots may be specified by an administrator in the COT based on experience. For example, the target slot may be the first slot after the starting of the COT, or the last slot before the ending of the COT. Therefore, in an example of this embodiment, the target slot may include the first slot and/or the last slot in the COT. In this case, the position of the target slot in the COT is fixed. While in some other examples of this embodiment, the base station may notify the terminal whether a subsequent slot is the target slot according to the downlink transmission demand of the base station. In this case, the relative position of the target slot in the COT is not fixed.

Several modes for the terminal to determine the target slot are described below.

A first mode: the base station and the terminal predetermine the relative position of the target slot in the COT, and then the base station transmits COT starting indication information to the terminal after the LBT is successfully executed to notify the terminal that the COT has been started. The terminal can determine whether a current moment is the target slot according to the COT starting indication information and the predetermined relative position of the target slot in the COT. For example, the base station and the terminal may predetermine that the first slot in the COT is the target slot on which fine downlink monitoring needs to be performed. After the terminal receives the COT starting indication information transmitted by the base station, as long as the time length from a moment receiving the COT starting indication information to the current moment is not longer than the length of one slot, the terminal can determine that the current moment is in the target slot.

The COT starting indication information described herein may include one or a combination of a preamble signal, a demodulation reference signal, a measurement reference signal, a synchronization signal, and a predefined sequence signal. The preamble signal, the demodulation reference signal and the synchronization signal are common signals, while the predefined sequence signal is pre-appointed by the base station and the terminal and specifically configured for notifying the starting of the COT.

A second mode: the terminal determines that a resource mapping type, which is indicated in a time-domain resource assignment indication within recently monitored downlink control information (DCI), corresponding to a physical downlink shared channel (PDSCH) is a second mapping type (e.g., mapping type B). It can be understood that if the time-domain resource assignment indication within the DCI information transmitted by the base station to the terminal indicates that the resource mapping type corresponding to the PDSCH is the first mapping type (e.g., mapping type A), then in a subsequent process, the base station may only transmit the downlink information to the terminal in the front three symbols of each slot. Correspondingly, the terminal only needs to perform the downlink monitoring for the front three symbols of each slot. However, if the resource mapping type, which is indicated in the time-domain resource assignment indication within the DCI information transmitted to the terminal by the base station, corresponding to PDSCH is the second mapping type, the base station may transmit the downlink information to the terminal at any symbol position in a slot in the subsequent process. Correspondingly, the terminal needs to perform the downlink monitoring not just on the front three symbols of each slot. Therefore, the monitoring granularity of the downlink monitoring of the terminal is usually smaller than the monitoring granularity corresponding to the first mapping type. Therefore, when the terminal receives the DCI information indicating that the resource mapping type is the second mapping type, the terminal can determine to enter the target slot, until the terminal receives DCI information in which the time-domain resource assignment indication indicates that the resource mapping type corresponding to the PDSCH is the first mapping type.

A third mode: when performing the downlink monitoring according to the common monitoring opportunity strategy, the terminal receives a switching trigger. The switching trigger is configured to trigger the terminal to switch (i.e., stop the currently used monitoring opportunity strategy and use another monitoring opportunity strategy) the monitoring opportunity strategy for the downlink monitoring to another monitoring opportunity strategy (i.e., from a first monitoring opportunity strategy to a second monitoring opportunity strategy). For example, if the monitoring opportunity strategy currently used is the target monitoring opportunity strategy, the terminal needs to switch to perform the downlink monitoring according to the common monitoring opportunity when receiving the switching trigger. On the contrary, if the terminal currently uses the common monitoring opportunity strategy for downlink monitoring, the terminal needs to switch to perform the downlink monitoring according to the target monitoring opportunity strategy after receiving the switching trigger. Therefore, in this embodiment, if the terminal receives a switching trigger when performing the downlink monitoring according to the common monitoring opportunity strategy, the terminal can determine to enter the target slot of the COT. The target slot will last until the terminal receives the switching trigger again.

In this embodiment, a specific Radio Network Temporary Identifier (RNTI) scrambled DCI signaling can be used as the switching trigger. In the DCI signaling, a 1 bit flag can be set to indicate whether to switch (i.e., stop the currently used monitoring opportunity strategy and use another monitoring opportunity strategy) the monitoring opportunity strategy for the downlink monitoring from a current monitoring opportunity strategy to another monitoring opportunity strategy (i.e., from a first monitoring opportunity strategy to a second monitoring opportunity strategy). For example, taking "0" as a switching flag, if the switching flag "0" is carried in the DCI signaling, this triggers the switch of the monitoring opportunity strategy used for the downlink monitoring. When such switching flag "0" is received, if the common monitoring opportunity strategy is used currently, the terminal needs to use the target monitoring opportunity strategy for the downlink monitoring in subsequent moments. If the terminal uses the target monitoring opportunity strategy currently, the terminal needs to use the common monitoring opportunity strategy for the downlink monitoring in the subsequent moments.

At S204, the terminal performs the downlink monitoring according to the target monitoring opportunity strategy corresponding to the target slot.

After the terminal determines that the current slot is the target slot in the COT, the downlink monitoring is performed at a corresponding monitoring starting time-frequency position according to the target monitoring opportunity strategy corresponding to the target slot. If the terminal determines that the current slot is not the target slot, the terminal can directly perform the downlink monitoring at the corresponding monitoring starting time-frequency position according to the common monitoring opportunity strategy.

Generally, after the base station successfully executes LBT and starts the COT, the base station firstly transmits Downlink Control Information (DCI) to the terminal. Therefore, the downlink monitoring of the terminal may be PDCCH monitoring which monitors the downlink control information transmitted by the base station. In some special cases, the base station may also transmit data directly to the terminal after the starting of the COT, namely, the base station may transmit the data without transmitting the downlink control information. In this case, the downlink monitoring of the terminal is blind monitoring of downlink data.

In the downlink monitoring method provided by the embodiments of the present disclosure, after determining that the current slot is the target slot in the COT, the terminal performs the downlink monitoring according to the target monitoring opportunity strategy corresponding to the target slot. Considering that after the base station starts a COT, there are more demands for the downlink transmission in some slots of the COT, while there are fewer demands for the downlink transmission in some other slots of the COT, the terminal and base station can take the slot or slots, on which there is a high probability of performing downlink transmission by the base station, in the COT (for example, the first slot and/or the last slot in the COT) as the target slot or target slots. By virtue of the feature that the monitoring granularity of the target monitoring opportunity strategy is smaller than the monitoring granularity of the common monitoring opportunity strategy, the terminal performs finer downlink monitoring on the target slot or target slots, thereby providing more downlink transmission opportunities for the base station. For other slots except for the target slot or target slots in the COT, the terminal can perform monitoring according to the common monitoring opportunity strategy, thereby reducing the burden of the downlink monitoring on the terminal and reducing the power consumption of the terminal.

Embodiment 2

Figure 3:
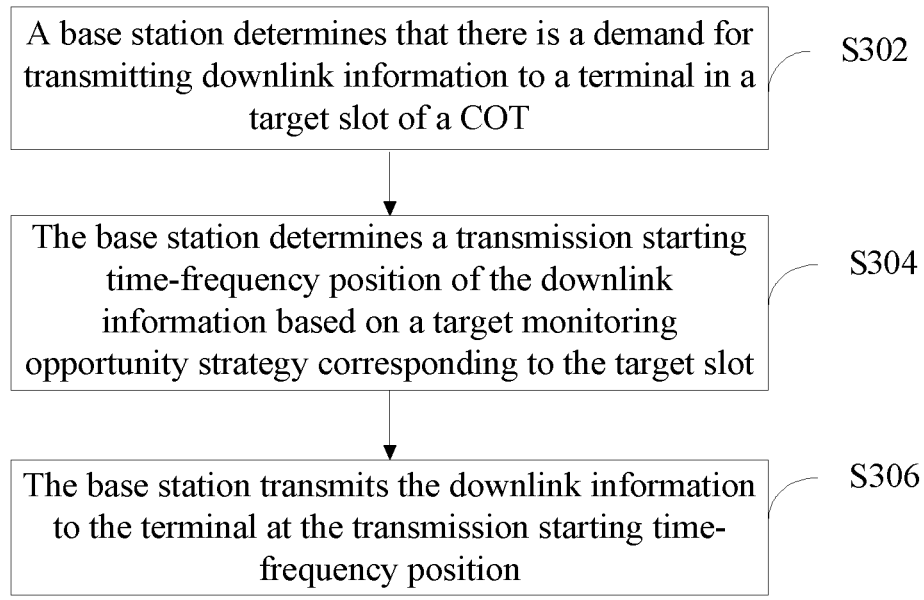
FIG. 3 is a flow chart of a downlink transmission method provided in embodiment 2 of the present disclosure.

This embodiment provides a downlink transmission method corresponding to the downlink monitoring method in the embodiment 1. The downlink transmission method is applied to a base station side and is executed by a base station. Since the downlink monitoring of the terminal is blind monitoring, the base station cannot arbitrarily determine the time-frequency position at which the base station starts transmitting the downlink transmission. The time-frequency position for transmitting the downlink information is required to be one of the time-frequency positions that the terminal performs the downlink monitoring. Therefore, the base station determines the starting time-frequency position for transmitting the downlink information according to the monitoring opportunity strategy of the downlink monitoring on the terminal. The downlink transmission method is described with reference to the flow chart as shown in FIG. 3. The downlink transmission method includes the following operations S302 to S306.

At S302, a base station determines that there is a demand for transmitting downlink information to a terminal in a target slot of a COT.

In this embodiment, the slots in one COT may be divided into one or more target slots and one or more common slots. When the base station determines that there is a demand for transmitting the downlink information to the terminal, the base station can determine whether the transmission demand of current transmission downlink information is the downlink transmission demand on the target slot or the common slot. Therefore, when determining whether there is a demand for transmitting the downlink information to the terminal in the target slot of the COT, the base station needs to firstly determine which slot (or slots) is the target slot (or target slots).

The target slot (or target slots) refers to one or more slots, on which the base station has intensive downlink transmission demands, in the COT. The one or more slots may be specified by an administrator in the COT based on experience. For example, the target slot may be the first slot after the starting of the COT, or the last slot before the ending of the COT. Therefore, in an example of this embodiment, the target slot may include the first slot and/or the last slot in the COT. In this case, the position of the target slot in the COT is fixed. While in some other examples of this embodiment, the base station may notify the terminal whether a subsequent slot is the target slot according to the downlink transmission demand of the base station. In this case, since the downlink transmission demands of the base station are not fixed, the relative position of the target slot in the COT is not fixed.

For the case where the relative position of the target slot in the COT is determined, the base station can notify the terminal of the relative position of the target slot in the COT through higher layer signaling in advance, or the administrator may configure the relative position on the base station and the terminal in advance. The base station and the terminal determine the relative position of the target slot in the COT. In an example of this embodiment, it is assumed that the base station and the terminal predetermine that the target slot is the first slot in the COT. In the subsequent process, after the base station successfully executes LBT and starts a COT, when there is a downlink transmission demand, the base station can determine whether the current time is in the target slot according to the time length between the current moment and the starting moment of the COT. In order to enable the terminal side to determine the target slot, in this embodiment, after the base station successfully executes the LBT and starts the COT, the base station can transmit COT starting indication information to the terminal so that the terminal can also know the starting moment of the COT. Thus, the position of the target slot can be determined by combining the starting moment of the COT and the predetermined relative position of the target slot in the COT.

The COT starting indication information described herein may include one or a combination of a preamble signal, a demodulation reference signal, a measurement reference signal, a synchronization signal, and a predefined sequence signal. The preamble signal, the demodulation reference signal and the synchronization signal are common signals, while the predefined sequence signal is pre-appointed by the base station and the terminal and specifically configured for notifying the starting of the COT.

For the case that the relative position of the target slot in the COT is not fixed, the base station can determine whether the current slot is the target slot according to whether the current demand for transmission is intensive. For example, at a certain moment, if the base station judges that downlink information needs to be transmitted to the terminal frequently within a period of time from the current moment, the base station can determine that all slots in this period of time belong to the target slots. In this case, the base station needs to notify the terminal of this situation, and the terminal can determine that the current slot belongs to the target slot.

In an example of this embodiment, the base station and the terminal pre-appoint that, if the resource mapping type, which is indicated in the time-domain resource assignment indication within the DCI information received by the terminal in moment t1, corresponding to PDSCH is the second mapping type and the resource mapping type, which is indicated in the time-domain resource assignment indication within the DCI information received by the terminal in moment t2, corresponding to the PDSCH is the first mapping type, then all slots between the moment t1 and the moment t2 belong to the target slots. Therefore, in this case, when the base station determines the starting of the target slot, the DCI which indicates that the resource mapping type corresponding to the PDSCH is the second mapping type is transmitted to the terminal.

In another example of this embodiment, the base station and the terminal pre-appoint that, if the terminal originally adopts a common monitoring opportunity strategy for downlink monitoring and receives a switching trigger transmitted by the base station at a certain moment, the terminal may determine to enter the target slot from the current moment until receiving the switching trigger transmitted by the base station again. In this example, the base station can use a specific RNTI scrambled DCI signaling as the switching trigger, and a 1 bit flag can be set in the DCI signaling to indicate whether it is necessary to switch (i.e., stop the currently used monitoring opportunity strategy and use another monitoring opportunity strategy) from the currently used monitoring opportunity strategy to another monitoring opportunity strategy (i.e., from a first monitoring opportunity strategy to a second monitoring opportunity strategy). For example, taking "0" as a switching flag, if the switching flag "0" is carried in the DCI signaling, this triggers the switch of the monitoring opportunity strategy used for the downlink monitoring. When such switching flag "0" is received, if the common monitoring opportunity strategy is used currently, the terminal needs to use the target monitoring opportunity strategy for the downlink monitoring in the subsequent moments. If the terminal uses the target monitoring opportunity strategy currently, the terminal needs to use the common monitoring opportunity strategy for the downlink monitoring in the subsequent moments. In some other examples of this embodiment, "1" may also be set as the switching flag.

At S304, the base station determines a transmission starting time-frequency position of the downlink information based on the target monitoring opportunity strategy corresponding to the target slot.

When the base station determines that there is a demand of transmitting downlink information to the terminal in the target slot, the base station can determine the transmission starting time-frequency position of the downlink information according to the target monitoring opportunity strategy. The transmission starting time-frequency position includes the time-domain position and the frequency-domain position of the information transmission. If the base station determines that there is a demand of transmitting downlink information to the terminal in the common slot, the transmission starting time-frequency position of the downlink information can be determined according to the common monitoring opportunity strategy corresponding to the common slot. It can be understood that no matter whether the base station determines the transmission starting time-frequency position of the downlink information according to the target monitoring opportunity strategy or determines the transmission starting time-frequency position of the downlink information according to the common monitoring opportunity strategy, the transmission starting time-frequency position determined by the base station should be in the to-be-monitored starting time-frequency position indicated by the target monitoring opportunity strategy/common monitoring opportunity strategy.

A monitoring granularity of the target monitoring opportunity strategy is smaller than a monitoring granularity of the common monitoring opportunity strategy. Therefore, when the terminal performs the downlink monitoring according to the target monitoring opportunity strategy, monitoring density is relatively high; and when the terminal performs the downlink monitoring according to the common monitoring opportunity strategy, the monitoring density is relatively low. It can be understood that, the smaller the monitoring granularity, the higher the corresponding monitoring density (which means that the base station has more downlink transmission opportunities); likewise, the larger the monitoring granularity, the lower the corresponding monitoring density (which means that the base station has fewer downlink transmission opportunities).

The monitoring granularity may include a time-domain monitoring granularity and a frequency-domain monitoring granularity. In this embodiment, the monitoring granularity of the target monitoring opportunity strategy is smaller than the monitoring granularity of the common monitoring opportunity strategy. This condition can be satisfied in the following three cases: the time-domain monitoring granularity of the target monitoring opportunity strategy is smaller than the time-domain monitoring granularity of the common monitoring opportunity strategy; or the frequency-domain monitoring granularity of the target monitoring opportunity strategy is smaller than the frequency-domain monitoring granularity of the common monitoring opportunity strategy; or the time-domain monitoring granularity and the frequency-domain monitoring granularity of the target monitoring opportunity strategy are respectively smaller than the time-domain monitoring granularity and the frequency-domain monitoring granularity corresponding to the common monitoring opportunity strategy.

In one example, the time-domain monitoring granularity refers to a ratio of a total symbol number to an actual number of monitored symbols, wherein the total symbol number refers to the number of all remaining symbols within the monitoring period when the PDCCH monitoring is started in the monitoring period. If the monitoring period T includes two slots, then according to general understanding, the monitoring period includes 28 symbols in total. The symbols to be monitored include all symbols with odd-numbered sequence number in the first slot (slot 1) and the symbols with sequence numbers of 1, 3, 5 and 9 in the second slot (slot 2). Therefore, the terminal will actually perform downlink monitoring on 18 symbols, which means that the monitoring granularity is 28/18, namely, 14/9. It can be understood that the slots included in the monitoring period are not necessarily all complete slots. In an example of this embodiment, when the terminal determines to enter the target slot, half of the target slot may have passed. In this case, the total symbol number in the monitoring period is 7.

Similar to the time-domain monitoring granularity, the frequency-domain monitoring granularity is a ratio of a total frequency band value to an actual monitored frequency band value. The total frequency band value is the sum of the frequency band values of all candidate frequency bands for the downlink transmission. By taking that the base station configures three Bandwidth Parts (BWP) for the terminal as an example, since the base station can use at least one of BWP1, BWP2, and BWP3 to transmit the downlink information to the terminal, the total frequency band value is the sum of the three BWP frequency bands. Herein the total frequency band value is assumed as 80 MHz. It can be understood that the terminal does not always perform the downlink monitoring at all frequency positions in the three BWPs. Assuming that the terminal performs the downlink monitoring within the monitoring period for 20 MHz in the BWP1 and 20 MHz in the BWP2, the actual monitored frequency band value is 40 MHz, so the frequency-domain monitoring granularity is 80/40, i.e., 2.

At S306, the base station transmits downlink information to the terminal at the transmission starting time-frequency position.

After the base station determines the transmission starting time-frequency position according to the target monitoring opportunity strategy, the downlink information can be transmitted to the terminal at the transmission starting time-frequency position. Generally, after the base station successfully executes LBT and starts a COT, DCI information is firstly transmitted to the terminal. Therefore, the downlink information transmitted by the base station to the terminal at the determined transmission starting time-frequency position may be DCI information. In some special cases, the base station may also transmit data to the terminal directly after the starting of the COT, namely, the base station may transmit the data without transmitting downlink control information. In this case, the downlink information transmitted by the base station to the terminal at the corresponding transmission starting time-frequency position is the downlink data.

In the downlink transmission method provided by the embodiment of the present disclosure, after the base station determines that there is a demand for transmitting the downlink information to the terminal in the target slot of the COT, the transmission starting time-frequency position of the downlink information can be determined based on the target monitoring opportunity strategy corresponding to the target slot, and then the downlink information is transmitted to the terminal at the determined transmission starting time-frequency position. Within a COT, the base station and the terminal can respectively perform downlink information transmission and downlink monitoring according to two monitoring opportunity strategies with different monitoring granularities. Based on this scheme, the base station can obtain downlink transmission opportunities timely in a slot on which the base station has more intensive and more frequent transmission demands, so as to quickly complete the transmission of the downlink information, thereby ensuring the transmission efficiency of the downlink information. In other slots on which the base station has less downlink transmission demand, the terminal does not need to perform downlink monitoring frequently, thereby reducing the monitoring burden and monitoring power consumption of the terminal. The downlink transmission method provided in this embodiment takes into account the downlink transmission efficiency of the base station and the power consumption on the terminal, and can improve the user experience effectively on the terminal compared to the practice in related technologies.

Embodiment 3

This embodiment further describes the downlink monitoring method and downlink transmission method in the above embodiment.

In order to ensure that the downlink transmission on the base station matches with the time-frequency position of the downlink monitoring on the terminal, in this embodiment, the terminal performs downlink monitoring on the target slot in the COT according to the target monitoring opportunity strategy and performs downlink monitoring on other common slots except for the target slot in the COT according to the common monitoring opportunity strategy. Correspondingly, if the base station needs to perform the downlink information transmission in the target slot, the base station needs to determine the transmission starting time-frequency position of the downlink information based on the target monitoring opportunity strategy. If the base station needs to transmit the downlink information to the terminal on other common slots except for the target slot in the COT, the base station needs to determine the transmission starting time-frequency position of the downlink transmission based on the common monitoring opportunity strategy. Therefore, before the terminal performs the downlink monitoring according to the target monitoring opportunity strategy, the terminal needs to determine the target monitoring opportunity strategy. Similarly, before the terminal performs the downlink monitoring according to the common monitoring opportunity strategy, the terminal needs to determine the common monitoring opportunity strategy. Correspondingly, before the base station performs the downlink transmission based on the target monitoring opportunity strategy, the base station needs to determine the target monitoring opportunity strategy. Similarly, before the base station performs downlink transmission based on the common monitoring opportunity strategy, the base station needs to determine the common monitoring opportunity strategy. The method used by the terminal and the base station to determine the target monitoring opportunity strategy is explained as follows.

The base station may semi-statically configure the target monitoring opportunity strategy to the terminal through higher layer signaling. The base station may firstly determine first semi-static configuration information which indicates the target monitoring opportunity strategy. After determining the first semi-static configuration information, the base station can transmit the first semi-static configuration information to the terminal. Afterwards, the base station and the terminal can determine the target monitoring opportunity strategy according to the first semi-static configuration information. In some examples of this embodiment, the base station may transmit the first semi-static configuration information to the terminal on the first symbol in the first slot of the COT.

In an example of this embodiment, the first semi-static configuration information may include a symbol indication and/or a frequency band indication. The symbol indication is used to indicate whether the downlink monitoring needs to be performed for each symbol in the target slot. The frequency band indication is used to indicate whether the downlink monitoring needs to be performed for each candidate frequency band in the target slot. For example, the symbol indication may be a symbol bitmap corresponding to respective symbols in the target slot. For example, if n symbols are included in the target slot, the symbol bitmap may also include n bits, and each bit corresponds to a symbol uniquely. Similarly, the frequency band indication may also be a frequency band bitmap, and each candidate frequency band corresponds to one bit in the frequency band bitmap, which is used to indicate whether the downlink monitoring needs to be performed for this candidate frequency band in the target slot.

In another example of this embodiment, the first semi-static configuration information may include a CORESET parameter and a search space parameter. In this example, the definition of the search space parameter is different from that of the search space parameter that the base station transmits to the terminal by the higher layer signaling in the related technology. In this example, the slot offset indicated by the search space parameter is the slot offset relative to the starting time of the COT.

In addition to the mode in which the terminal and the base station determine the same target monitoring opportunity strategy through the manner that the base station transmits the first semi-static configuration information to the terminal, this embodiment provides another mode through which the terminal and the base station can determine the target monitoring opportunity strategy.

The terminal and the base station determine the target monitoring opportunity strategy in a predefined manner. For example, the base station may receive a first predefined configuration parameter, and then determine the target monitoring opportunity strategy according to the first predefined configuration parameter. The first predefined configuration parameter can be input to the base station by an administrator of the base station. The terminal can also determine the target monitoring opportunity strategy based on obtained first predefined configuration parameter. For example, the terminal receives and stores the first predefined configuration parameter input by the programmer during the design and production stages. During the using stage of the user, the terminal may also receive the first predefined configuration parameter transmitted by the programmer to the terminal through a network, etc. For example, when the system is upgraded, the first predefined configuration parameter may be carried in an upgraded file and transmitted to the terminal.

The two modes for the base station and the terminal to determine the target monitoring opportunity strategy have been described above. The processes of determining the common monitoring opportunity strategy by the base station and the terminal are respectively described below.

Similar to determining the target monitoring opportunity strategy, the base station and terminal also have the following two modes when determining the common monitoring opportunity strategy.

Mode 1: the base station determines second semi-static configuration information, determines the common monitoring opportunity strategy according to the second semi-static configuration information, and transmits the second semi-static configuration information to the terminal. After receiving the second semi-static configuration information, the terminal can determine the common monitoring opportunity strategy for monitoring common slots in the COT according to the second semi-static configuration information.

Mode 2: the base station and the terminal respectively receive second predefined configuration parameter, and then determine the common monitoring opportunity strategy according to the second predefined configuration parameter.

Similar to the first semi-static configuration information, the second semi-static configuration information may also include symbol indication and frequency band indication. For example, the second semi-static configuration information includes a symbol bitmap corresponding to respective symbols in the common slot, and/or the second semi-static configuration information includes a frequency band bitmap corresponding to the same candidate frequency band. In other examples of this embodiment, the CORESET parameter and the search space parameter may also be used in the second semi-static configuration information to indicate the time-frequency position to be monitored in the common slot. Similarly, the slot offset indicated by the search space parameter in the second semi-static configuration information is the slot offset relative to the starting moment of COT.

Therefore, in this embodiment, several cases may be present when the base station and the terminal determine the target monitoring opportunity strategy and the common monitoring opportunity strategy.

Case 1: the base station and the terminal use the first semi-static configuration information and the second semi-static configuration information respectively to determine the target monitoring opportunity strategy and the common monitoring opportunity strategy. In this case, the first semi-static configuration information and the second semi-static configuration information may be transmitted to the terminal simultaneously by the base station. It is assumed that the target slot is the first slot in the COT, and the common slot is the other slots except for the first slot in the COT. In this case, the base station may configure two monitoring opportunity strategies to the terminal through higher layer signaling. The monitoring opportunity strategy with a smaller monitoring granularity corresponds to the target slot, namely, the first slot in the COT. The other monitoring opportunity strategy with the larger monitoring granularity corresponds to the common slot, and is the common monitoring opportunity strategy.

Case 2: the base station and the terminal determine the target monitoring opportunity strategy and the common monitoring opportunity strategy according to the first predefined configuration parameter and the second predefined configuration parameter respectively. It can be understood that when the common monitoring opportunity strategy and the target monitoring opportunity strategy are configured to the terminal and the base station in a predefined manner, the first predefined configuration parameter and the second predefined parameter may be input to the terminal or the base station in combination, or may be input to the terminal or the base station separately. Similarly, it is assumed that the target slot is the first slot in the COT, the base station and the terminal may configure two monitoring opportunity strategies with different monitoring granularities in a predefined manner. The monitoring opportunity strategy with a smaller monitoring granularity is the target monitoring opportunity strategy, and the monitoring opportunity strategy with a larger monitoring granularity is the common monitoring opportunity strategy.

Case 3: the base station and the terminal determine the target monitoring opportunity strategy according to the first semi-static configuration information, and determine the common monitoring opportunity strategy according to the second predefined configuration parameter. If the first slot and last slot of the COT are the target slots, the terminal performs the downlink monitoring on the first slot and the last slot in the COT according to the target monitoring opportunity strategy determined according to the first semi-static configuration information, and performs the downlink monitoring on other slots except for the first slot and the last slot in the COT according to the common monitoring opportunity strategy determined according to the second predefined configuration parameter.

Case 4: the base station and the terminal determine the target monitoring opportunity strategy according to the first predefined configuration parameter, and determine the common monitoring opportunity strategy according to the second semi-static configuration information.

In the above examples, the base station and the terminal may configure the target monitoring opportunity strategy and the common monitoring opportunity strategy through higher layer signaling semi-static configuration and predefined configuration. In some examples of this embodiment, the base station and the terminal may determine a granularity threshold value in advance, and then determine the target monitoring opportunity strategy and the common monitoring opportunity strategy according to the granularity threshold value. For the target slot, the monitoring granularity is smaller than the granularity threshold value; while for other common slots, the monitoring granularity is larger than the granularity threshold value. However, in this mode, after the base station determines the target monitoring opportunity strategy according to the granularity threshold value, and determines the transmission starting time-frequency position of the downlink information according to the target monitoring opportunity strategy, the terminal may need to attempt the downlink monitoring according to several target monitoring opportunity strategies before successfully monitoring the downlink information transmitted by the base station. The plurality of target monitoring opportunity strategies are determined based on the predetermined granularity threshold value.

The downlink monitoring method and downlink transmission method provided in this embodiment can determine the target monitoring opportunity strategy and the common monitoring opportunity strategy by means of higher layer signaling semi-static configuration and/or predefined configuration, which provides flexible methods for the configuration of the target monitoring opportunity strategy and common monitoring opportunity strategy. The cooperation of the downlink monitoring method and the downlink transmission method not only ensures that the base station has sufficient opportunities to transmit downlink information to the terminal in time, but also ensures that the monitoring complexity of the terminal is not too high, thereby improving the user experience on the terminal.

Embodiment 4

Figure 4:
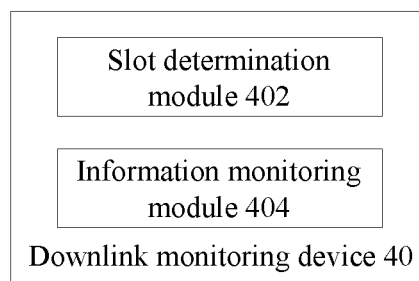
FIG. 4 is a structural schematic diagram of a downlink monitoring device provided in embodiment 4 of the prevent disclosure.

This embodiment provides a downlink monitoring device. Please refer to FIG. 4, the downlink monitoring device 40 includes a slot determination module 402 and an information monitoring module 404. The slot determination module 402 is configured to determine that a current slot is a target slot in a COT. The information monitoring module 404 is configured to perform downlink monitoring according to a target monitoring opportunity strategy corresponding to the target slot.

In this embodiment, the information monitoring module 404 of the downlink monitoring device 40 does not perform downlink monitoring only according to the monitoring opportunity strategy which is semi-statically configured by the base station and is irrelevant to the slots in the COT, instead the information monitoring module 404 performs the downlink monitoring based on a downlink monitoring granularity which is related to the slots in the COT. The slots in one COT may be divided into one or more target slots and one or more common slots. For a target slot, the information monitoring module 404 can perform the downlink monitoring according to the target monitoring opportunity strategy. For other slots except for the target slot in the COT, the information monitoring module 404 can perform the downlink monitoring according to the common monitoring opportunity strategy. The monitoring granularity of the target monitoring opportunity strategy is smaller than the monitoring granularity of the common monitoring opportunity strategy. Therefore, when the information monitoring module 404 performs the downlink monitoring according to the target monitoring opportunity strategy, the monitoring density is relatively high. When the information monitoring module 404 performs the downlink monitoring according to the common monitoring opportunity strategy, the monitoring density is relatively low. It can be understood that, the smaller the monitoring granularity, the higher the corresponding monitoring density (which means that the monitoring intensity is higher, and the downlink monitoring is finer); likewise, the larger the monitoring granularity, the lower the corresponding monitoring density (which means that the monitoring intensity is lower, and the downlink monitoring is rougher). Therefore, in this embodiment, the information monitoring module 404 performs more and finer downlink monitoring on the target slot in the COT. For the common slot, the information monitoring module 404 performs less monitoring on the common slot. Correspondingly, the base station has relatively dense downlink transmission opportunities in the target slot of the COT, while has relatively sparse downlink transmission opportunities in the common slot.

The monitoring granularity may include a time-domain monitoring granularity and a frequency-domain monitoring granularity. In this embodiment, the monitoring granularity of the target monitoring opportunity strategy is smaller than the monitoring granularity of the common monitoring opportunity strategy. This condition can be satisfied in the following three cases: the time-domain monitoring granularity of the target monitoring opportunity strategy is smaller than the time-domain monitoring granularity of the common monitoring opportunity strategy; or the frequency-domain monitoring granularity of the target monitoring opportunity strategy is smaller than the frequency-domain monitoring granularity of the common monitoring opportunity strategy; or the time-domain monitoring granularity and the frequency-domain monitoring granularity of the target monitoring opportunity strategy are respectively smaller than the time-domain monitoring granularity and the frequency-domain monitoring granularity corresponding to the common monitoring opportunity strategy.

In one example, the time-domain monitoring granularity refers to a ratio of a total symbol number to an actual number of monitored symbols, wherein the total symbol number refers to the number of all remaining symbols within the monitoring period when the PDCCH monitoring is started in the monitoring period. As shown in FIG. 1, if the monitoring period T includes two slots, then according to general understanding, the monitoring period includes 28 symbols in total. The symbols to be monitored include all symbols with odd-numbered sequence number in the first slot (slot 1) and the symbols with sequence numbers of 1, 3, 5 and 9 in the second slot (slot 2). Therefore, the information monitoring module 404 will actually perform downlink monitoring on 18 symbols, which means that the monitoring granularity is 28/18, namely, 14/9. It can be understood that the slots included in the monitoring period are not necessarily all complete slots. In an example of this embodiment, when the slot determination module 402 determines to enter the target slot, half of the target slot may have passed. In this case, the total symbol number in the monitoring period is 7.

Similar to the time-domain monitoring granularity, the frequency-domain monitoring granularity is a ratio of a total frequency band value to an actual monitored frequency band value. The total frequency band value is the sum of the frequency band values of all candidate frequency bands for the downlink transmission. By taking that the base station configures three Bandwidth Parts (BWP) for the downlink monitoring device 40 as an example, since the base station can use at least one of BWP1, BWP2, and BWP3 to transmit the downlink information to the downlink monitoring device 40, the total frequency band value is the sum of the three BWP frequency bands. Herein the total frequency band value is assumed as 80 MHz. It can be understood that the information monitoring module 404 does not always perform the downlink monitoring at all frequency positions in the three BWPs. Assuming that the information monitoring module 404 performs the downlink monitoring within the monitoring period for 20 MHz in the BWP1 and 20 MHz in the BWP2, the actual monitored frequency band value is 40 MHz, so the frequency-domain monitoring granularity is 80/40, i.e., 2.

It can be understood that when the information monitoring module 404 performs the downlink monitoring according to the target monitoring opportunity strategy, finer downlink monitoring can be performed on the corresponding target slot, and thus denser downlink transmission opportunities can be provided to the base station. Therefore, in this embodiment, the target slot (or target slots) refers to one or more slots, on which the base station has intensive downlink transmission demands, in the COT. The one or more slots may be specified by an administrator in the COT based on experience. For example, the target slot may be the first slot after the starting of the COT, or the last slot before the ending of the COT. Therefore, in an example of this embodiment, the target slot may include the first slot and/or the last slot in the COT. In this case, the position of the target slot in the COT is fixed. While in some other examples of this embodiment, the base station may notify the downlink monitoring device 40 whether a subsequent slot is the target slot according to the downlink transmission demand of the base station. In this case, the relative position of the target slot in the COT is not fixed.

Several modes for the slot determination module 402 to determine the target slot are described below.

A first mode: the base station and the downlink monitoring device 40 predetermine the relative position of the target slot in the COT, and then the base station transmits the COT starting indication information to the downlink monitoring device 40 after executing LBT successfully and notifies the slot determination module 402 that COT has been started. According to the COT starting indication information and the predetermined relative position of the target slot in the COT, the slot determination module 402 can determine whether the current moment is the target slot. For example, the base station and the downlink monitoring device 40 may predetermine that the first slot in the COT is the target slot on which fine downlink monitoring needs to be performed. After the slot determination module 402 receives the COT starting indication information transmitted by the base station, as long as the time length from a moment receiving the COT starting indication information to the current moment is not longer than the length of one slot, the slot determination module 402 can determine that the current slot is the target slot.

The COT starting indication information described herein may include one or a combination of a preamble signal, a demodulation reference signal, a measurement reference signal, a synchronization signal, and a predefined sequence signal. The preamble signal, the demodulation reference signal and the synchronization signal are common signals, while the predefined sequence signal is pre-appointed by the base station and the downlink monitoring device 40 and specifically configured for notifying the starting of the COT.

A second mode: the slot determination module 402 determines that a resource mapping type, which is indicated in a time-domain resource assignment indication within recently monitored downlink control information (DCI), corresponding to a physical downlink shared channel (PDSCH) is a second mapping type (e.g., mapping type B). It can be understood that if the time-domain resource assignment indication within the DCI information transmitted by the base station to the downlink monitoring device 40 indicates that the resource mapping type corresponding to the PDSCH is the first mapping type (e.g., mapping type A), then in a subsequent process, the base station may only transmit the downlink information to the downlink monitoring device 40 in the front three symbols of each slot. Correspondingly, the information monitoring module 404 only needs to perform the downlink monitoring for the front three symbols of each slot. However, if the resource mapping type, which is indicated in the time-domain resource assignment indication within the DCI information transmitted to the downlink monitoring device 40 by the base station, corresponding to PDSCH is the second mapping type, the base station may transmit the downlink information to the downlink monitoring device 40 at any symbol position in a slot in the subsequent process. Correspondingly, the information monitoring module 404 needs to perform the downlink monitoring not just on the front three symbols of each slot. Therefore, the monitoring granularity of the downlink monitoring of the information monitoring module 404 is usually smaller than the monitoring granularity corresponding to the first mapping type. Therefore, when the downlink monitoring device 40 receives the DCI information indicating that the resource mapping type is the second mapping type, the slot determination module 402 can determine to enter the target slot, until the downlink monitoring device 40 receives DCI information in which the time-domain resource assignment indication indicates that the resource mapping type corresponding to the PDSCH is the first mapping type.

Mode 3, when the information monitoring module 404 performs the downlink monitoring according to the common monitoring opportunity strategy, the downlink monitoring device 40 receives a switching trigger. The switching trigger is configured to trigger the information monitoring module 404 to switch (i.e., stop the currently used monitoring opportunity strategy and use another monitoring opportunity strategy) the monitoring opportunity strategy for the downlink monitoring to another monitoring opportunity strategy (i.e., from a first monitoring opportunity strategy to a second monitoring opportunity strategy). For example, if the monitoring opportunity strategy currently used is the target monitoring opportunity strategy, the information monitoring module 404 needs to switch to perform the downlink monitoring according to the common monitoring opportunity when receiving the switching trigger. On the contrary, if the information monitoring module 404 currently uses the common monitoring opportunity strategy for downlink monitoring, the information monitoring module 404 needs to switch to perform the downlink monitoring according to the target monitoring opportunity strategy after receiving the switching trigger. Therefore, in this embodiment, if the downlink monitoring device 40 receives a switching trigger when the information monitoring module 404 performs the downlink monitoring according to the common monitoring opportunity strategy, the slot determination module 402 can determine to enter the target slot of the COT. The target slot will last until the downlink monitoring device 40 receives the switching trigger again.

In this embodiment, a specific RNTI scrambled DCI signaling can be used as the switching trigger. In the DCI signaling, a 1 bit flag can be set to indicate whether to switch (i.e., stop the currently used monitoring opportunity strategy and use another monitoring opportunity strategy) the monitoring opportunity strategy for the downlink monitoring from a current monitoring opportunity strategy to another monitoring opportunity strategy (i.e., from a first monitoring opportunity strategy to a second monitoring opportunity strategy). For example, taking "0" as a switching flag, if the switching flag "0" is carried in the DCI signaling, this triggers the switch of the monitoring opportunity strategy used for the downlink monitoring. When such switching flag "0" is received, if the common monitoring opportunity strategy is used currently, the information monitoring module 404 needs to use the target monitoring opportunity strategy for the downlink monitoring in subsequent moments. If the information monitoring module 404 uses the target monitoring opportunity strategy currently, the common monitoring opportunity strategy for the downlink monitoring needs to be used in the subsequent moments.

After the slot determination module 402 determines that the current slot is the target slot in the COT, the information monitoring module 404 starts to perform the downlink monitoring at the corresponding time-frequency position according to the target monitoring opportunity strategy corresponding to the target slot. If the slot determination module 402 determines that the current slot is not the target slot, the information monitoring module 404 can start target monitoring directly at the corresponding time-frequency position according to the common monitoring opportunity strategy.

Generally, after the base station successfully executes LBT and starts the COT, the base station firstly transmits DCI to the downlink monitoring device 40. Therefore, the downlink monitoring of the information monitoring module 404 may be PDCCH monitoring which monitors the downlink control information transmitted by the base station. In some special cases, the base station may also transmit data directly to the downlink monitoring device 40 after the starting of the COT, namely, the base station may transmit the data without transmitting the downlink control information. In this case, the downlink monitoring of the information monitoring module 404 is blind monitoring of downlink data.

The downlink monitoring device 40 provided in this embodiment may be deployed on a terminal. The functions of the slot determination module 402 and the information monitoring module 404 can be implemented through the cooperation of the processor and the communication device of the terminal.

In the downlink monitoring device provided by the embodiments of the present disclosure, after the slot determination module 402 determines that the current slot is the target slot in the COT, the information monitoring module 404 performs the downlink monitoring according to the target monitoring opportunity strategy corresponding to the target slot. Considering that after the base station starts a COT, there are more demands for the downlink transmission in some slots of the COT, while there are fewer demands for the downlink transmission in some other slots of the COT, the downlink monitoring device 40 and base station can take the slot or slots, on which there is a high probability of performing downlink transmission by the base station, in the COT (for example, the first slot and/or the last slot in the COT) as the target slot or target slots. By virtue of the feature that the monitoring granularity of the target monitoring opportunity strategy is smaller than the monitoring granularity of the common monitoring opportunity strategy, the information monitoring module 404 performs finer downlink monitoring on the target slot or target slots, thereby providing more downlink transmission opportunities for the base station. For other slots except for the target slot or target slots in the COT, the information monitoring module 404 can perform monitoring according to the common monitoring opportunity strategy, thereby reducing the burden of the downlink monitoring on the downlink monitoring device 40 and reducing the power consumption of the downlink monitoring device 40.

Embodiment 5

Figure 5:
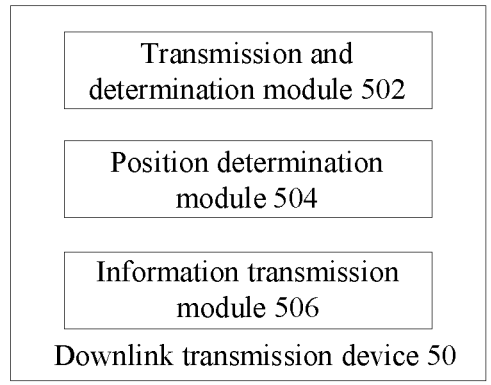
FIG. 5 is a structural schematic diagram of a downlink transmission device provided in embodiment 5 of the present disclosure.

This embodiment provides a downlink transmission device. Please refer to FIG. 5, the downlink transmission device 50 includes a transmission and determination module 502, a position determination module 504 and an information transmission module 506. The transmission and determination module 502 is configured to determine that there is a demand for transmitting downlink information to the terminal in the target slot of the COT. The position determination module 504 is configured to determine the transmission starting time-frequency position of the downlink information based on the target monitoring opportunity strategy corresponding to the target slot. The information transmission module 506 is configured to transmit the downlink information to the terminal at the transmission starting time-frequency position.

In this embodiment, the slots in one COT may be divided into one or more target slots and one or more common slots. When the transmission and determination module 502 determines that there is a demand for transmitting the downlink information to the terminal, the transmission and determination module 502 can determine whether the transmission demand of current transmission downlink information is the downlink transmission demand on the target slot or the downlink transmission demand on the common slot. Therefore, when determining whether the transmission and determination module 502 has the demand for transmitting the downlink information to the terminal in the target slot of the COT, the transmission and determination module 502 needs to firstly determine which slot (or slots) is the target slot (or target slots).

The target slot (or target slots) refers to one or more slots, on which the downlink transmission device 50 has intensive downlink transmission demands, in the COT. The one or more slots may be specified by an administrator in the COT based on experience. For example, the target slot may be the first slot after the starting of the COT, or the last slot before the ending of the COT. Therefore, in an example of this embodiment, the target slot may include the first slot and/or the last slot in the COT. In this case, the position of the target slot in the COT is fixed. While in some other examples of this embodiment, the transmission and determination module 502 may notify the terminal whether a subsequent slot is the target slot according to the downlink transmission demand of the downlink transmission device 50. In this case, since the downlink transmission demands of the downlink transmission device 50 are not fixed, the relative position of the target slot in the COT is not fixed.

For the case where the relative position of the target slot in the COT is determined, the downlink transmission device 50 can notify the terminal of the relative position of the target slot in the COT through higher layer signaling in advance, or the administrator may configure the relative position on the downlink transmission device and the terminal in advance. The downlink transmission device 50 and the terminal determine the relative position of the target slot in the COT. In an example of this embodiment, it is assumed that the downlink transmission device 50 and the terminal predetermine that the target slot is the first slot in the COT. In the subsequent process, after the downlink transmission device 50 successfully executes LBT and starts a COT, when there is a downlink transmission demand, the transmission and determination module 502 can determine whether the current slot is target slot according to the time length between the current moment and the starting moment of the COT. In order to enable the terminal side to determine the target slot, in this embodiment, after successfully executing LBT and starting the COT, the downlink transmission device 50 can transmit COT starting indication information to the terminal so that the terminal can also know the starting moment of the COT. Thus, the position of the target slot can be determined by combining the starting moment of the COT and the predetermined relative position of the target slot in the COT.

The COT starting indication information described herein may include one or a combination of a preamble signal, a demodulation reference signal, a measurement reference signal, a synchronization signal, and a predefined sequence signal. The preamble signal, the demodulation reference signal and the synchronization signal are common signals, while the predefined sequence signal is pre-appointed by the downlink transmission device 50 and the terminal and specifically configured for notifying the starting of the COT.

For the case that the relative position of the target slot in the COT is not fixed, the transmission and determination module 502 can determine whether the current slot is the target slot according to whether the current demand for transmission is intensive. For example, at a certain moment, if the transmission and determination module 502 judges that downlink information needs to be transmitted to the terminal frequently within a period of time from the current moment, the transmission and determination module 502 can determine that all slots in this period of time belong to the target slots. In this case, the transmission and determination module 502 needs to notify the terminal of this situation, and the terminal can determine that the current slot belongs to the target slot.

In an example of this embodiment, the downlink transmission device 50 and the terminal pre-appoint that, if the resource mapping type, which is indicated in the time-domain resource assignment indication within the DCI information received by the terminal in moment t1, corresponding to PDSCH is the second mapping type and the resource mapping type, which is indicated in the time-domain resource assignment indication within the DCI information received by the terminal in moment t2, corresponding to the PDSCH is the first mapping type, then all slots between the moment t1 and the moment t2 belong to the target slots. Therefore, in this case, when the transmission and determination module 502 determines the starting of the target slot, the DCI which indicates that the resource mapping type corresponding to the PDSCH is the second mapping type is transmitted to the terminal.

In another example of this embodiment, the downlink transmission device 50 and the terminal pre-appoint that, if the terminal originally adopts a common monitoring opportunity strategy for downlink monitoring and receives a switching trigger transmitted by the base station at a certain moment, the terminal may determine to enter the target slot from the current moment until receiving the switching trigger transmitted by the downlink transmission device 50 again. In this example, the downlink transmission device 50 can use a specific RNTI scrambled DCI signaling as the switching trigger, and a 1 bit flag can be set in the DCI signaling to indicate whether it is necessary to switch (i. e., stop the currently used monitoring opportunity strategy and use another monitoring opportunity strategy) from the currently used monitoring opportunity strategy to another monitoring opportunity strategy (i.e., from a first monitoring opportunity strategy to a second monitoring opportunity strategy). For example, taking "0" as a switching flag, if the DCI signaling carries the switching flag "0", this triggers the switch of the monitoring opportunity strategy used for downlink monitoring. When such switching flag "0" is received, if the common monitoring opportunity strategy is used currently, the terminal needs to use the target monitoring opportunity strategy for downlink monitoring in subsequent moments. If the terminal uses the target monitoring opportunity strategy currently, the terminal needs to use the common monitoring opportunity strategy for downlink monitoring in the subsequent moments. In some other examples of this embodiment, "1" may also be set as the switching flag.

When the transmission and determination module 502 determines that the downlink information needs to be transmitted to the terminal in the target slot, the position determination module 504 can determine the transmission starting time-frequency position of the downlink information according to the target monitoring opportunity strategy. The transmission starting time-frequency position includes the time-domain position and the frequency-domain position for information transmission. If the downlink transmission device 50 determines that the downlink information needs to be transmitted to the terminal in the common slot, the transmission starting time-frequency position of the downlink information can be determined according to the common monitoring opportunity strategy corresponding to the common slot. It can be understood that no matter whether the downlink transmission device 50 determines the transmission starting time-frequency position of the downlink information according to the target monitoring opportunity strategy or determines the starting time-frequency position of the downlink information according to the common monitoring opportunity strategy, the transmission starting time-frequency position determined by the position determination module 504 should be in the to-be-monitored starting time-frequency position indicated by the target monitoring opportunity strategy/common monitoring opportunity strategy.

The monitoring granularity of the target monitoring opportunity strategy is smaller than the monitoring granularity of the common monitoring opportunity strategy. Therefore, when the terminal performs downlink monitoring according to the target monitoring opportunity strategy, the monitoring density is relatively large. When the terminal performs monitoring according to the common monitoring opportunity strategy, the monitoring density is relatively small. It can be understood that the smaller the monitoring granularity of the terminal, the larger the corresponding monitoring density and the more opportunities the information transmission module 506 have for transmitting the downlink information. Likewise, the larger the monitoring granularity of the terminal, the smaller the corresponding monitoring density and the fewer opportunities the information transmission module 506 have for transmitting the downlink information.

The monitoring granularity may include a time-domain monitoring granularity and a frequency-domain monitoring granularity. In this embodiment, the monitoring granularity of the target monitoring opportunity strategy is smaller than the monitoring granularity of the common monitoring opportunity strategy. This condition can be satisfied in the following three cases: the time-domain monitoring granularity of the target monitoring opportunity strategy is smaller than the time-domain monitoring granularity of the common monitoring opportunity strategy; or the frequency-domain monitoring granularity of the target monitoring opportunity strategy is smaller than the frequency-domain monitoring granularity of the common monitoring opportunity strategy; or the time-domain monitoring granularity and the frequency-domain monitoring granularity of the target monitoring opportunity strategy are respectively smaller than the time-domain monitoring granularity and the frequency-domain monitoring granularity corresponding to the common monitoring opportunity strategy.

In one example, the time-domain monitoring granularity refers to a ratio of a total symbol number to an actual number of monitored symbols, wherein the total symbol number refers to the number of all remaining symbols within the monitoring period when the PDCCH monitoring is started in the monitoring period. If the monitoring period T includes two slots, then according to general understanding, the monitoring period includes 28 symbols in total. The symbols to be monitored include all symbols with odd-numbered sequence number in the first slot (slot 1) and the symbols with sequence numbers of 1, 3, 5 and 9 in the second slot (slot 2). Therefore, the terminal will actually perform downlink monitoring on 18 symbols, which means that the monitoring granularity is 28/18, namely, 14/9. It can be understood that the slots included in the monitoring period are not necessarily all complete slots. In an example of this embodiment, when the terminal determines to enter the target slot, half of the target slot may have passed. In this case, the total symbol number in the monitoring period is 7.

Similar to the time-domain monitoring granularity, the frequency-domain monitoring granularity is a ratio of a total frequency band value to an actual monitored frequency band value. The total frequency band value is the sum of the frequency band values of all candidate frequency bands for the downlink transmission. By taking that the downlink transmission device 50 configures three BWPs for the terminal as an example, since the information transmission module 506 can use at least one of BWP1, BWP2, and BWP3 to transmit the downlink information to the terminal, the total frequency band value is the sum of the three BWP frequency bands. Herein the total frequency band value is assumed as 80 MHz. It can be understood that the terminal does not always perform the downlink monitoring at all frequency positions in the three BWPs. Assuming that the terminal performs the downlink monitoring within the monitoring period for 20 MHz in the BWP1 and 20 MHz in the BWP2, the actual monitored frequency band value is 40 MHz, so the frequency-domain monitoring granularity is 80/40, i.e., 2.

After the position determination module 504 determines the transmission starting time-frequency position according to the target monitoring opportunity strategy, the information transmission module 506 can transmit the downlink information to the terminal at the transmission starting time-frequency position. Generally, after the downlink transmission device 50 successfully executes LBT and starts a COT, DCI information is firstly transmitted to the terminal. Therefore, the downlink information transmitted by the information transmission module 506 to the terminal at the determined transmission starting time-frequency position may be DCI information. In some special cases, the information transmission module 506 may also transmit data to the terminal directly after the starting of the COT, namely, the information transmission module 506 may transmit the data without transmitting downlink control information. In this case, the downlink information transmitted by the information transmission module 506 to the terminal at the corresponding transmission starting time-frequency position is the downlink data.

In this embodiment, the downlink transmission device 50 can be deployed on the base station side, for example, on the base station. The functions of the transmission and determination module 502 and the position determination module 504 can be realized by the base station processor, and the function of the information transmission module 506 can be realized by the communication unit of the base station.

In the downlink transmission device provided by the embodiment of the present disclosure, after determining that there is a demand for transmitting the downlink information to the terminal in the target slot of the COT, the downlink transmission device 50 can determine the transmission starting time-frequency position of the downlink information based on the target monitoring opportunity strategy corresponding to the target slot, and then transmit the downlink information to the terminal at the determined transmission starting time-frequency position. Within a COT, the downlink transmission device 50 and the terminal can respectively perform downlink information transmission and downlink monitoring according to two monitoring opportunity strategies with different monitoring granularities. Based on this scheme, the downlink transmission device 50 can obtain downlink transmission opportunities timely in a slot on which the downlink transmission device 50 has more intensive and more frequent transmission demands, so as to quickly complete the transmission of the downlink information, thereby ensuring the transmission efficiency of the downlink information. In other slots on which the downlink transmission device 50 has less downlink transmission demands, the terminal does not need to perform downlink monitoring frequently, thereby reducing the monitoring burden and monitoring power consumption of the terminal. The downlink transmission device 50 provided in this embodiment takes into account the downlink transmission efficiency of the downlink transmission device and the power consumption on the terminal, and can improve the user experience effectively on the terminal compared to the practice in related technologies.

Embodiment 6

Figure 6:
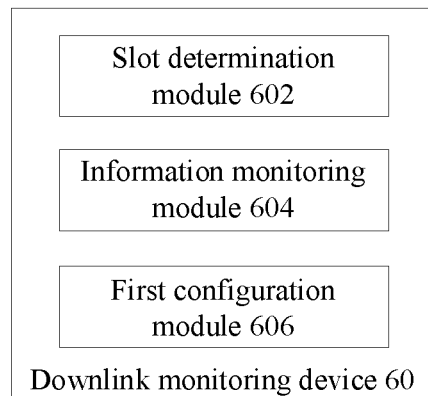
FIG. 6 is a structural schematic diagram of a downlink monitoring device provided in embodiment 6 of the prevent disclosure.
Figure 7:
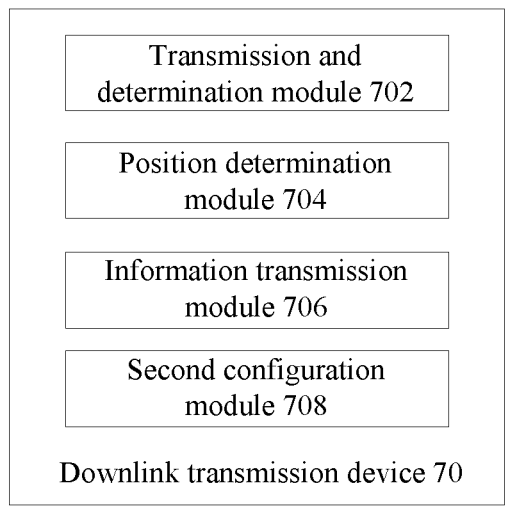
FIG. 7 is a structural schematic diagram of a downlink transmission device provided in embodiment 6 of the present disclosure.

This embodiment provides a downlink monitoring device and a downlink transmission device. Please refer to the structure schematic diagram of the downlink monitoring device 60 as shown in FIG. 6 and the structure schematic diagram of the downlink transmission device 70 as shown in FIG. 7.

The downlink monitoring device 60 includes a first configuration module 606 in addition to a slot determination module 602 for determining that the current slot is a target slot in a COT and an information monitoring module 604 for performing downlink monitoring according to a target monitoring opportunity strategy corresponding to the target slot. The first configuration module 606 is configured to determine the target monitoring opportunity strategy.

The downlink transmission device 70 includes a second configuration module 708 in addition to a transmission and determination module 702 for determining that there is a demand for transmitting downlink information to a terminal in a target slot of a COT, a position determination module 704 for determining a transmission starting time-frequency position of the downlink information based on a target monitoring opportunity strategy corresponding to the target slot, and an information transmission module 706 for transmitting the downlink information to the terminal at the transmission starting time-frequency position. The second configuration module 708 is configured to determine the target monitoring opportunity strategy.

In order to ensure that the downlink transmission on the downlink transmission device 70 matches with the time-frequency position of the downlink monitoring on the downlink monitoring device 60, in this embodiment, the information monitoring module 604 performs downlink monitoring on the target slot in the COT according to the target monitoring opportunity strategy and performs downlink monitoring on other common slots except for the target slot in the COT according to the common monitoring opportunity strategy. Correspondingly, if the transmission and determination module 702 determines that the information transmission module 706 performs the downlink information transmission in the target slot, the position determination module 704 needs to determine the transmission starting time-frequency position of the downlink information based on the target monitoring opportunity strategy. If the information transmission module 706 needs to transmit the downlink information to the downlink monitoring device 60 on other common slots except for the target slot in the COT, the position determination module 704 needs to determine the transmission starting time-frequency position of the downlink transmission based on the target monitoring opportunity strategy. Therefore, if the information transmission module 706 needs to transmit the downlink information to the downlink monitoring device 60 on other common slots except for the target slot in the COT, the position determination module 704 needs to determine the transmission starting time-frequency position transmitted by the downlink based on the common monitoring opportunity strategy. Therefore, before the information monitoring module 604 performs the downlink monitoring according to the target monitoring opportunity strategy, the first configuration module 606 needs to determine the target monitoring opportunity strategy. In some examples of the embodiment, before the information monitoring module 604 performs the downlink monitoring according to the common monitoring opportunity strategy, the first configuration module 606 needs to determine the common monitoring opportunity strategy. Correspondingly, before the information transmission module 706 performs the downlink transmission based on the target monitoring opportunity strategy, the second configuration module 708 needs to determine the target monitoring opportunity strategy. Before the information transmission module 706 performs downlink transmission based on the common monitoring opportunity strategy, the second configuration module 708 needs to determine the common monitoring opportunity strategy. The method used by the first configuration module 606 and the second configuration module 708 to determine the target monitoring opportunity strategy is explained as follows.

The second configuration module 708 may semi-statically configure the target monitoring opportunity strategy to the terminal through higher layer signaling. The second configuration module 708 may firstly determine first semi-static configuration information which indicates the target monitoring opportunity strategy. After determining the first semi-static configuration information, the downlink transmission device 70 can transmit the first semi-static configuration information to the downlink monitoring device 60. Afterwards, the second configuration module 708 and the first configuration module 606 can determine the target monitoring opportunity strategy according to the first semi-static configuration information. In some examples of this embodiment, the downlink transmission device 70 may transmit the first semi-static configuration information to the downlink monitoring device 60 on the first symbol in the first slot of the COT.

In an example of this embodiment, the first semi-static configuration information may include a symbol indication and/or a frequency band indication. The symbol indication is used to indicate whether the downlink monitoring needs to be performed for each symbol in the target slot. The frequency band indication is used to indicate whether the downlink monitoring needs to be performed for each candidate frequency band in the target slot. For example, the symbol indication may be a symbol bitmap corresponding to respective symbols in the target slot. For example, if n symbols are included in the target slot, the symbol bitmap may also include n bits, and each bit corresponds to a symbol uniquely. Similarly, the frequency band indication may also be a frequency band bitmap, and each candidate frequency band corresponds to one bit in the frequency band bitmap, which is used to indicate whether the downlink monitoring needs to be performed for this candidate frequency band in the target slot.

In another example of this embodiment, the first semi-static configuration information may include a CORESET parameter and a search space parameter. In this example, the definition of the search space parameter is different from that of the search space parameter that the downlink transmission device 70 transmits to the downlink monitoring device 60 by the higher layer signaling in the related technology. In this example, the slot offset indicated by the search space parameter is the slot offset relative to the starting time of the COT.

In addition to the mode in which the first configuration module 606 and the second configuration module 708 determine the same target monitoring opportunity strategy through the manner that the downlink transmission device 70 transmits the first semi-static configuration information to the downlink monitoring device 60, this embodiment provides another mode for determining the target monitoring opportunity strategy by the first configuration module 606 and the second configuration module 708.

The first configuration module 606 and the second configuration module 708 determine the target monitoring opportunity strategy in a predefined manner. For example, the second configuration module 708 may receive a first predefined configuration parameter, and then determine the target monitoring opportunity strategy according to the first predefined configuration parameter. The first predefined configuration parameter can be input to the second configuration module 708 by an administrator. The first configuration module 606 can also determine the target monitoring opportunity strategy based on obtained first predefined configuration parameter. For example, the first configuration module 606 receives and stores the first predefined configuration parameter input by the programmer during the design and production stage of the downlink monitoring device 60. During the using stage of the user, the programmer can transmit the first predefined configuration parameter to the first configuration module 606 through the network. For example, when the system is upgraded, the first predefined configuration parameter may be carried in the upgrade file and transmitted to the first configuration module 606.

The two modes for the second configuration module 708 and the first configuration module 606 to determine the target monitoring opportunity strategy have been described above. The processes of determining the common monitoring opportunity strategy by the second configuration module 708 and the first configuration module 606 are respectively described below.

Similar to determining the target monitoring opportunity strategy, the second configuration module 708 and the first configuration module 606 also have the following two modes when determining the common monitoring opportunity strategy.

Mode 1: the second configuration module 708 determines the second semi-static configuration information, determines the common monitoring opportunity strategy according to the second semi-static configuration information, and transmits the second semi-static configuration information to the first configuration module 606. After receiving the second semi-static configuration information, the first configuration module 606 can determine the common monitoring opportunity strategy for monitoring common slots in the COT according to the second semi-static configuration information.

Mode 2: the second configuration module 708 and the first configuration module 606 respectively receive the second predefined configuration parameter, and then determine the common monitoring opportunity strategy according to the second predefined configuration parameter.

Similar to the first semi-static configuration information, the second semi-static configuration information may also include symbol indication and frequency band indication. For example, the second semi-static configuration information includes a symbol bitmap corresponding to respective symbols in the common slot, and/or the second semi-static configuration information includes a frequency band bitmap corresponding to the same candidate frequency band. In other examples of this embodiment, the CORESET parameter and the search space parameter may also be used in the second semi-static configuration information to indicate the time-frequency position to be monitored in the common slot. Similarly, the slot offset indicated by the search space parameter in the second semi-static configuration information is the slot offset relative to the starting moment of COT.

Therefore, in this embodiment, several cases may be present when the second configuration module 708 and the first configuration module 606 determine the target monitoring opportunity strategy and the common monitoring opportunity strategy.

Case 1: the second configuration module 708 and the first configuration module 606 use the first semi-static configuration information and the second semi-static configuration information respectively to determine the target monitoring opportunity strategy and the common monitoring opportunity strategy. In this case, the first semi-static configuration information and the second semi-static configuration information may be transmitted to the downlink monitoring device 60 simultaneously by the downlink transmission device 70. It is assumed that the target slot is the first slot in the COT, and the common slot is the other slots except for the first slot in the COT. In this case, the downlink transmission device 70 may configure two monitoring opportunity strategies to the downlink monitoring device 60 through higher layer signaling. The monitoring opportunity strategy with a smaller monitoring granularity corresponds to the target slot, namely, the first slot in the COT. The other monitoring opportunity strategy with the larger monitoring granularity corresponds to the common slot, and is the common monitoring opportunity strategy.

Case 2: the second configuration module 708 and the first configuration module 606 determine the target monitoring opportunity strategy and the common monitoring opportunity strategy according to the first predefined configuration parameter and the second predefined configuration parameter respectively. It can be understood that when the common monitoring opportunity strategy and the target monitoring opportunity strategy are configured to the downlink monitoring device 60 and the downlink transmission device 70 in a predefined manner, the first predefined configuration parameter and the second predefined parameter may be input to the downlink monitoring device 60 or the downlink transmission device 70 in combination, or input to the downlink monitoring device 60 or the downlink transmission device 70 respectively. Similarly, it is assumed that the target slot is the first slot in the COT, the second configuration module 708 and the first configuration module 606 may configure two monitoring opportunity strategies with different monitoring granularities in a predefined manner. The monitoring opportunity strategy with a smaller monitoring granularity is the target monitoring opportunity strategy, and the monitoring opportunity strategy with a larger monitoring granularity is the common monitoring opportunity strategy.

Case 3: the second configuration module 708 and the first configuration module 606 determine the target monitoring opportunity strategy according to the first semi-static configuration information, and determine the common monitoring opportunity strategy according to the second predefined configuration parameter. If the first slot and last slot of the COT are the target slots, the first configuration module 606 performs the downlink monitoring on the first slot and the last slot in the COT according to the target monitoring opportunity strategy determined according to the first semi-static configuration information, and performs the downlink monitoring on other slots except for the first slot and the last slot in the COT according to the common monitoring opportunity strategy determined according to the second predefined configuration parameter.

Case 4: the second configuration module 708 and the first configuration module 606 determine the target monitoring opportunity strategy according to the first predefined configuration parameter, and determine the common monitoring opportunity strategy according to the second semi-static configuration information.

In the above examples, the second configuration module 708 and the second configuration module 606 may configure the target monitoring opportunity strategy and the common monitoring opportunity strategy through higher layer signaling semi-static configuration and predefined configuration. In some examples of this embodiment, the second configuration module 708 and the second configuration module 606 may determine a granularity threshold value in advance, and then determine the target monitoring opportunity strategy and the common monitoring opportunity strategy according to the granularity threshold value. For the target slot, the monitoring granularity is smaller than the granularity threshold value; while for other common slots, the monitoring granularity is larger than the granularity threshold value. However, in this mode, after the downlink transmission device 70 determines the target monitoring opportunity strategy according to the granularity threshold value, and determines the transmission starting time-frequency position of the downlink information according to the target monitoring opportunity strategy, the downlink monitoring device 60 may need to attempt the downlink monitoring according to several target monitoring opportunity strategies before successfully monitoring the downlink information transmitted by the downlink transmission device 70. The plurality of target monitoring opportunity strategies are determined based on the predetermined granularity threshold value.

The downlink monitoring device 60 in this embodiment can be deployed on the terminal. The functions of the slot determination module 602 and the information monitoring module 604 may be implemented by the cooperation of the processor and the communication unit of the terminal. The function of the first configuration module 606 may be implemented by the processor of the terminal, or implemented by the cooperation of the processor and the communication unit of the terminal.

The downlink transmission device 70 can be deployed on a base station. The functions of the transmission and determination module 702 and the position determination module 704 may be implemented by the base station processor, and the functions of the information transmission module 706 may be implemented by the communication unit of the base station. The functions of the second configuration module 708 may be implemented by the processor of the base station, or implemented by the cooperation of the processor and the communication unit of the base station.

The downlink monitoring device and downlink transmission method provided in this embodiment can determine the target monitoring opportunity strategy and the common monitoring opportunity strategy by means of higher layer signaling semi-static configuration and/or predefined configuration, which provides flexible methods for the configuration of the target monitoring opportunity strategy and common monitoring opportunity strategy. The cooperation of the downlink monitoring method and the downlink transmission method not only ensures that the downlink transmission device has sufficient opportunities to transmit downlink information to the downlink monitoring time in time, but also ensures that the monitoring complexity of the downlink monitoring device is not too high, thereby improving the user experience on the downlink monitoring device.

Embodiment 7

This embodiment provides a storage medium. The storage medium can store one or more computer programs that can be read, compiled and executed by one or more processors. In this embodiment, the storage medium can store at least one of the downlink monitoring program and the downlink transmission program. The downlink monitoring program can be used by one or the plurality of processors to execute the operations in any one of the downlink monitoring methods described in the embodiments 1-3. The downlink transmission program can be used by one or the plurality of processors to execute the operations in any one of the downlink transmission methods described in the embodiments 2-3.

Figure 8:
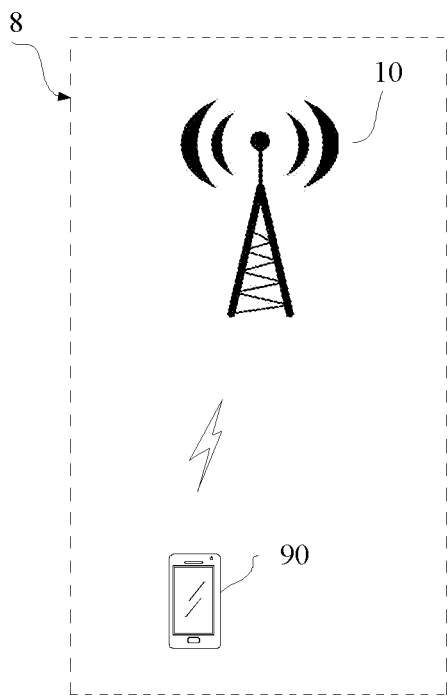
FIG. 8 is a schematic diagram of a communication system provided in embodiment 7 of the present disclosure.
Figure 9:
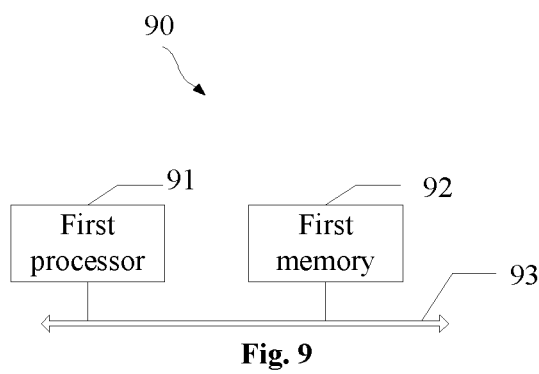
FIG. 9 is a structural schematic diagram of hardware of a terminal provided in embodiment 7 of the present disclosure.
Figure 10:
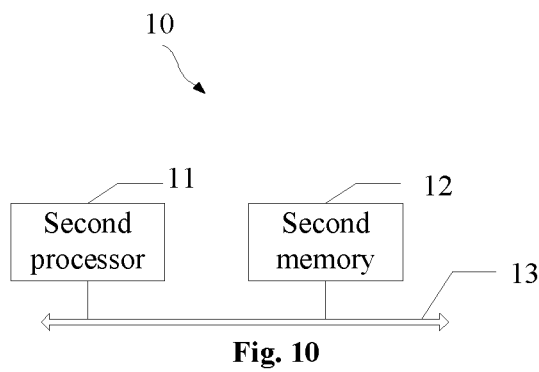
FIG. 10 is a structural schematic diagram of hardware of a base station provided in embodiment 7 of the present disclosure.

This embodiment also provides a communication system. Please refer to FIG. 8. The communication system 8 includes a terminal 90 and a base station 10. The structure of the terminal 90 and the structure of the base station 10 are briefly described below in conjunction with FIG. 9 and FIG. 10.

The terminal 90 includes a first processor 91, a first memory 92 and a first communication bus 93 for connecting the first processor 91 and the first memory 92. The first memory 92 may be the above storage medium storing the downlink monitoring program. The first processor 91 can read the downlink monitoring program stored in the first memory 92, and compile and execute the operations for implementing any one of the downlink monitoring methods described in the embodiments 1-3. Details of implementing the downlink monitoring method in the embodiments 1-3 at the terminal 90 can be found in the description of the above embodiments, and will not be repeated here.

The base station 10 includes a second processor 11, a second memory 12 and a second communication bus 13 for connecting the second processor 11 and the second memory 12. The second memory 12 may be the above storage medium storing the downlink transmission program. The second processor 11 can read the downlink transmission program stored in the second memory 12, and compile and execute the operations for implementing any one of the downlink transmission methods described in the embodiments 2-3. Details of implementing the downlink transmission method in the embodiments 2-3 at the base station 10 can be found in the description of the above embodiments, and will not be repeated here.

The embodiments provide a communication system, a terminal, a base station and a storage medium. The terminal can use the common monitoring opportunity strategy for monitoring the common slot in the COT, and use the target monitoring opportunity strategy for monitoring the target slot in the COT. The monitoring granularity of the target monitoring opportunity strategy is smaller than the monitoring granularity of the common monitoring opportunity strategy, that is, the monitoring density for the target slot is larger, so the base station has relatively dense transmission opportunities in the target slot. When downlink transmission is required, the transmission opportunity can be obtained without waiting for a long time, and the downlink information can be transmitted at the corresponding time-frequency position. For other slots in the COT, the monitoring granularity of the terminal is large and the monitoring density is small, so that the monitoring workload of the terminal is relatively small, which is beneficial to reducing the power consumption of the downlink monitoring on the terminal.

Embodiment 8

The communication system, the base station, the terminal, the downlink transmission method at the base station and the downlink monitoring method at the terminal will be explained below in conjunction with a plurality of specific examples.

It is assumed that the downlink information transmitted by the base station to the terminal in this embodiment is downlink control information, namely, the downlink monitoring performed at the terminal is actually downlink PDCCH monitoring. It is also assumed that the base station and the terminal pre-appoint that the target slot is the first slot in the COT.

Example 1

This example will introduce the process that the base station configures the monitoring opportunity strategy to the terminal by the higher layer signaling from the perspective of the base station. The monitoring opportunity strategy described herein may include the monitoring opportunity strategy of the first slot in the COT, or include the monitoring opportunity strategy of other slots except for the first slot in the COT, or include both monitoring opportunity strategies at the same time.

Firstly, the base station configures, through higher layer signaling, the time-frequency position for performing PDCCH monitoring at the terminal. The specific configuration includes the following cases.

Case 1: the current configuration is only intended for the first slot in COT;

Case 2: the current configuration includes the configuration on two PDCCH monitoring opportunity strategies. The first monitoring opportunity strategy (target monitoring opportunity strategy) is used for the first slot in COT, and the second monitoring opportunity strategy (common monitoring opportunity strategy) is used for other slots except for the first slot in the COT.

In this example, the base station may configure the time-frequency domain position to be monitored through higher layer signaling including the CORESET parameter and the search space parameter. For the frequency-domain position, the base station can perform CORESET configuration in units of 20 MHz, namely, configure a CORESET for every 20 MHz bandwidth. For the time-domain position, the base station may configure the monitoring period as 1 ms, and indicate that the downlink monitoring needs to be performed each symbol in the monitoring period. In some other examples of this embodiment, the base station may alternatively notify the terminal that the base station performs downlink transmission only on the odd-numbered symbols in the monitoring period, or that the base station performs DCI information transmission on the even-numbered symbols in the monitoring period. In an example of this embodiment, the base station may transmit a symbol bitmap to the terminal at the first symbol position of the first slot after executing the LBT process successfully, so as to indicate to the terminal which symbols need the PDCCH monitoring.

The base station may configure the downlink monitoring opportunity strategy for all slots in the COT to the terminal. In such a case, the base station may configure the candidate symbol positions for downlink transmission by the base station in the first slot in the COT through special higher layer signaling, and may configure the candidate symbol positions for downlink transmission by the base station in other slots in the COT through the existing configuration parameters of the PDCCH resources.

After the base station configures the monitoring opportunity strategy for the terminal, the base station, when successfully executing the LBT and having DCI information to be transmitted, can transmit the DCI information on the earliest symbol selected from the configured candidate symbol positions.

In this embodiment, since the target slot refers to the first slot in the COT, after the ending of the first slot in the COT, the base station will switch to using the second monitoring opportunity strategy to determine the transmission starting time-frequency position of DCI. In such a case, the terminal shall also switch to performing PDCCH monitoring according to the second monitoring opportunity strategy.

In some examples of this embodiment, the base station may transmit COT starting indication information to the terminal when the COT is started, so that the terminal can determine the time of switching to the second monitoring opportunity strategy according to the COT starting indication information. It can be understood that the COT starting indication information may include at least one of a preamble signal, a demodulation reference signal, a measurement reference signal, a synchronization signal, and a predefined sequence signal.

In another example of this embodiment, the base station may transmit the switching trigger to the terminal on the last symbol of the first slot or the first symbol of the second slot of the COT, so that the terminal can switch the adopted monitoring opportunity strategy from the first monitoring opportunity strategy to the second monitoring opportunity strategy. For example, the base station can notify the terminal of switching the monitoring opportunity strategy by a special DCI format, a special RNTI scrambled DCI, or a 1 bit flag in the DCI information to trigger the switching between the two monitoring opportunity strategies.

In another example of this embodiment, the base station may also transmit DCI information containing a time-domain resource assignment indication, which indicates that resource mapping type corresponding to the PDSCH is the first mapping type, to the terminal so as to trigger the terminal to switch to the second monitoring opportunity strategy for PDCCH monitoring. The first mapping type is, e.g., the mapping type A. After transmitting the DCI information containing a time-domain resource assignment indication, which indicates that resource mapping type corresponding to the PDSCH is the first mapping type, to the terminal, the base station can only use the front three symbols of each slot for the downlink information transmission. Therefore, in this example, the terminal needs to perform downlink monitoring on the front three symbols of each slot at most according to the second monitoring opportunity strategy.

Through the solution of this example, on one hand, the base station can be ensured to transmit the downlink control information as soon as possible after the LBT processing is successful, thereby improving spectrum utilization; on the other hand, the base station is enabled to flexibly adjust the position of candidate symbols in other slots in the COT.

Example 2

This example will introduce the process that the terminal determines the monitoring opportunity strategy and performs the downlink monitoring from the perspective of the terminal. The monitoring opportunity strategy described herein may include the monitoring opportunity strategy of the first slot in the COT, or include the monitoring opportunity strategy of other slots except for the first slot in the COT, or include both monitoring opportunity strategies at the same time.

Firstly, the terminal obtains the starting time-frequency position, on which the PDCCH monitoring is to be performed, through higher layer signaling.

In some examples, the terminal may obtain the monitoring opportunity strategy of the first slot in the COT through higher layer signaling. For example, the base station may configure the PDCCH monitoring starting time-frequency position of the first slot in the COT to the terminal by the special parameters. For example, if the starting symbol position parameter configured by the higher layer signaling is 10100101001010, the terminal can determine that the symbols with sequence numbers 0, 2, 5, 7, 10, and 12 in the first slot are the symbol positions on which the PDCCH monitoring is to be performed. In another example, the base station specifies the monitoring opportunity strategy of the first slot through the PDCCH parameter of the authorized carrier defined in NR. For example, the terminal determines that the monitoring period is 10 ms and the slot offset is 0 after receiving the monitoring Slot Periodicity And Offset parameter corresponding to the search space IE configured by the higher layer signaling. In this situation, the terminal performs PDCCH blind monitoring on the first slot on which the base station starts to transmit the data.

In other examples, the terminal may obtain two monitoring opportunity strategies through higher layer signaling. The monitoring opportunity strategy with a smaller monitoring granularity is used for the first slot in the COT, and the other is used for other slot in the COT. The time-frequency granularity for PDCCH monitoring in the parameter configuration of one monitoring opportunity strategy is relatively small and is used in the monitoring on the first slot after the base station successfully executes the LBT, while the time-frequency granularity for PDCCH monitoring in the parameter configuration of the other monitoring opportunity strategy is relatively large and is used in the monitoring on the second slot after the base station successfully executes the LBT.

Figure 11:
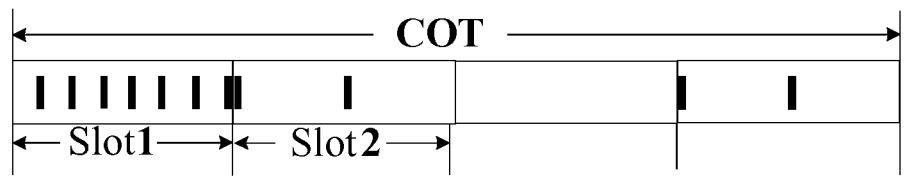
FIG. 11 is a schematic diagram of a time-domain monitoring pattern provided in example 2 of embodiment 8 of the present disclosure.

For example, the base station configures two search space IEs for a terminal. The monitoring Slot Periodicity And Offset parameter in one search space IE indicates that the monitoring period is 10 ms and the slot offset is 0. The bitmap in the monitoring Symbols Within Slot parameter is 01010101010101, which indicates that the monitored symbols are the odd-numbered symbols in the slot (it is assumed that the sequence number of the symbol in the slot in this embodiment starts from 0). The monitoring Slot Periodicity And Offset parameter in another search space IE indicates that the monitoring period is 2 ms and the slot offset is 1. The bitmap in the monitoring Symbols Within Slot parameter is 10000001000000, which indicates that the monitored symbols are symbol 0 and symbol 7. The former configuration is used for the first slot in the COT, and the latter configuration is used for the other slot in the COT. The monitoring pattern shown in FIG. 11 can be obtained through the above configuration.

However, those having ordinary skill in the art can understand that the terminal may also obtain the monitoring opportunity strategy for other slots except for the first slot in the COT through only higher layer signaling. For the case where the terminal obtains only one monitoring opportunity strategy through higher layer signaling, the terminal can obtain the other monitoring opportunity strategy in a predefined manner.

Example 3

In the above two examples, the solution for the base station and the terminal to determine the time-domain position on which the PDCCH is to be monitored in the monitoring opportunity strategy is mainly described. This example will introduce the solution for determining the frequency-domain position on which the PDCCH is to be monitored.

For the first slot in the COT, in order to increase the probability of transmission by the base station, the base station may configure a plurality of CORESETs with different frequency-domain positions, and then the base station determines the number of CORESET finally used for downlink transmission according to the results of the LBT. For other slots in the COT, the number of configured CORESET in the same frequency-domain is less than the number of CORESET on the first slot.

For example, in a bandwidth of 80 MHz, the base station configures four CORESETs through higher layer signaling. Further, the four CORESETs may belong to different BWPs, namely, the four CORESETs belong to BWPs with different BWP IDs. The frequency-domain positions between different CORESETs are not overlapped, namely, each CORESET is located in a different 20 MHz frequency-domain range. Then the base station executes LBT processing on the 80 MHz bandwidth based on a granularity of 20 MHz. The base station finally determines the number and position of the transmission CORESET according to the CORESET corresponding to the frequency-domain position of the 20 MHz bandwidth on which the LBT is. It is assumed that the base station successfully executes the LBT on the 20 MHz bandwidth corresponding to the first and third CORESETs, in such a case the base station performs downlink transmission on these two CORESETs.

Figure 12:
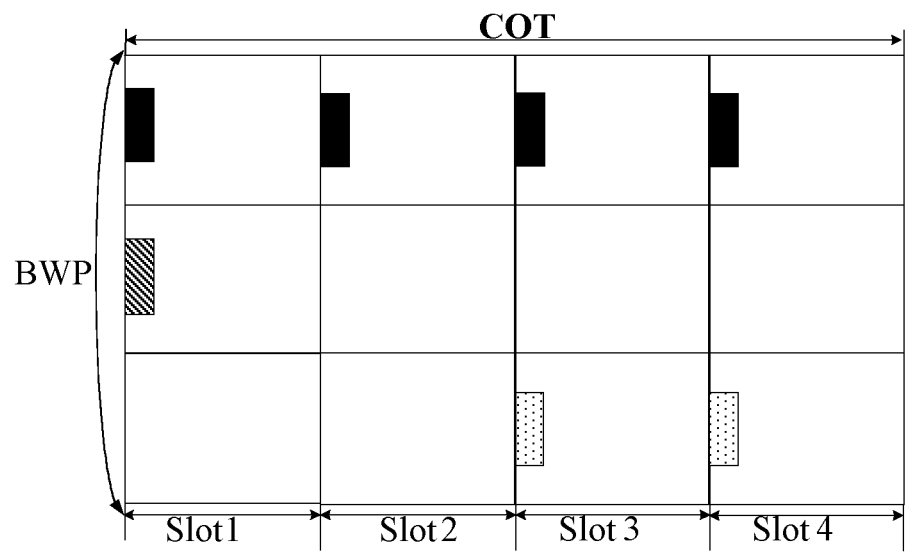
FIG. 12 is a schematic diagram of a frequency-domain monitoring pattern provided in example 3 of embodiment 8 of the present disclosure.

In an example, the transmission of a channel occupies the CORESET of the front three slots of the COT, namely, the pattern of the downlink control channel search set is as shown in FIG. 12. The base station configures, through higher layer signaling, that CORESET1 is in the first 20

MHz on a certain BWP, CORESET2 is in the second 20 MHz on the BWP, and CORESET3 is in the third 20 MHz on the BWP. In the time-domain, the base station configures that CORESET1 is corresponding to search space 1, the transmission period is 1 ms, and the slot offset is 0. In the time-domain, the base station configures that CORESET2 is corresponding to search space 2, the transmission period is 5 ms, and the slot offset is 0. In the time-domain, the base station configures that CORESET3 is corresponding to search space 3, the transmission period is 1 ms, and the slot offset is 2.

The solution of example 3 can increase the downlink transmission opportunity on the slot after the base station successfully executes the LBT, and reduce the complexity of PDCCH monitoring by the terminal in the subsequent slots, thereby reducing the power consumption of the terminal.

Those having ordinary skill in the art should understand that the downlink monitoring and transmission methods and devices, the base station, the terminal and the storage medium provided in the embodiments of the present disclosure can be applied not only to 5G communication systems, but also to any future communication system.

Apparently, those having ordinary skill in the art should understand that all or some of the operations in the disclosed method, and function modules/units in the system and the device can be implemented as software (which can be implemented by program codes executable by a computing device), firmware, hardware and the appropriate combinations thereof. In hardware implementations, the division between function modules/units mentioned in the above description does not necessarily correspond to the division of physical components. For example, one physical component may have multiple functions, or one function or operation can be executed by a plurality of physical components. Some physical components or all physical components may be implemented as software executed by a processor, such as a central processing unit, a digital signal processor, or a microprocessor. Alternatively, some physical components or all physical components may be implemented as hardware, or as an integrated circuit, such as an application specific integrated circuit. Such software can be stored on a computer readable medium and executed by a computing device. In some cases, the operations shown or described may be executed in an order different from an order described herein. The computer readable medium may include computer storage medium (or non-transitory medium) and communication medium (or transitory medium). Those having ordinary skill in the art should know that the term 'computer storage medium' includes volatile and non-volatile, removable and non-removable medium implemented in any method or technology for storing information (such as computer readable instructions, data structures, program modules, or other data). Computer storage medium includes but is not limited to RAM, ROM, EEPROM, flash memory or other memory technologies, CD-ROM, digital video disk (DVD) or other optical disk storage, magnetic cassettes, tapes, magnetic disk storage or other magnetic storage devices, or any other medium configured to store desired information and that can be accessed by a computer. In addition, those having ordinary skill in the art should know that communication medium usually contains computer readable instructions, data structures, program modules, or other data in a modulated data signal such as carrier waves or other transmission mechanisms, and may include any information delivery medium. Therefore, the embodiments of the present disclosure are not limited to any specific hardware and software combination.

The above content is a further detailed description of the embodiments of the present disclosure in conjunction with specific implementations. The specific implementation of the present disclosure should not be considered to be limited to these descriptions. Those having ordinary skill in the art can also make several simple deductions or substitutions without departing from the principle of the present disclosure, and the deductions or substitutions shall be regarded to fall within the protection scope defined by the appended claims of the present disclosure.

What is claimed is:

1. A downlink monitoring method, comprising:
    receiving first semi-static configuration information transmitted by a base station, and determining a first monitoring opportunity strategy according to the first semi-static configuration information; or, receiving second semi-static configuration information transmitted by a base station, and determining a second monitoring opportunity strategy according to the second semi-static configuration information;
    receiving, by a terminal, a switching trigger; and
    switching, by the terminal according to the switching trigger, a monitoring opportunity strategy for downlink monitoring from the first monitoring opportunity strategy which is currently used to the second monitoring opportunity strategy.

2. The downlink monitoring method according to claim 1, wherein the first semi-static configuration information comprises: first symbol indication used to indicate whether the downlink monitoring needs to be performed for each symbol in a slot corresponding to the first monitoring opportunity strategy in a channel occupancy term (COT), and/or first frequency band indication used to indicate whether the downlink monitoring needs to be performed for each candidate frequency band in the slot corresponding to the first monitoring opportunity strategy; or, the first semi-static configuration information comprises a control resource set (CORESET) parameter and a search space parameter; or,
    the second semi-static configuration information comprises: second symbol indication used to indicate whether the downlink monitoring needs to be performed for each symbol in a slot corresponding to the second monitoring opportunity strategy in a COT, and/or second frequency band indication used to indicate whether the downlink monitoring needs to be performed for each candidate frequency band in the slot corresponding to the second monitoring opportunity strategy; or, the second semi-static configuration information comprises a control resource set, CORESET, parameter and a search space parameter.

3. The downlink monitoring method according to claim 2, wherein the first symbol indication is a symbol bitmap corresponding to each symbol in the slot corresponding to the first monitoring opportunity strategy; and the first frequency band indication is a frequency band bitmap corresponding to each candidate frequency band; or,
    the second symbol indication is a symbol bitmap corresponding to each symbol in the slot corresponding to the second monitoring opportunity strategy; and the second frequency band indication is a frequency band bitmap corresponding to each candidate frequency band.

4. The downlink monitoring method according to claim 1, wherein the downlink monitoring comprises: physical downlink control channel (PDCCH) monitoring.

5. The downlink monitoring method according to claim 1, further comprising:

when determining that a current slot is a target slot in a channel occupancy term, COT, performing downlink monitoring according to a target monitoring opportunity strategy corresponding to the target slot;

wherein a mode for determining that the current slot is the target slot in the COT comprises any one of:

a first mode: determining that a current moment is within the target slot in the COT according to a moment of receiving COT starting indication information and a predetermined relative position of the target slot in the COT;

a second mode: determining that a resource mapping type, which is indicated in a time-domain resource assignment indication within recently monitored downlink control information, corresponding to a physical downlink shared channel (PDSCH) is a second mapping type.

6. The downlink monitoring method according to claim 5, wherein the COT starting indication information comprises at least one of: a preamble signal, a demodulation reference signal, a measurement reference signal, a synchronization signal and a predefined sequence signal.

7. A downlink transmission method, comprising:

sending, by a base station to a terminal, a switching trigger for triggering switching of a monitoring opportunity strategy for downlink monitoring from a first monitoring opportunity strategy to a second monitoring opportunity strategy;

determining, by the base station based on the second monitoring opportunity strategy, a transmission starting time-frequency position of the downlink information to be transmitted to the terminal; and transmitting, by the base station, the downlink information to the terminal at the transmission starting time-frequency position.

8. The downlink transmission method according to claim 7, further comprising:

determining first semi-static configuration information, determining the first monitoring opportunity strategy according to the first semi-static configuration information, and transmitting the first semi-static configuration information to the terminal;

or, determining second semi-static configuration information, determining the second monitoring opportunity strategy according to the second semi-static configuration information, and transmitting the second semi-static configuration information to the terminal.

9. The downlink transmission method according to claim 8, wherein the first semi-static configuration information comprises: first symbol indication used to indicate whether the downlink monitoring needs to be performed for each symbol in a slot corresponding to the first monitoring opportunity strategy in a channel occupancy term (COT), and/or first frequency band indication used to indicate whether the downlink monitoring needs to be performed for each candidate frequency band in the slot corresponding to the first monitoring opportunity strategy; or, the first semi-static configuration information comprises a control resource set (CORESET) parameter and a search space parameter; or, the second semi-static configuration information comprises: second symbol indication used to indicate whether the downlink monitoring needs to be performed for each symbol in a slot corresponding to the second monitoring opportunity strategy in a COT, and/or second frequency band indication used to indicate whether the downlink monitoring needs to be performed for each candidate frequency band in the slot corresponding to the second monitoring opportunity strategy; or, the second semi-static configuration information comprises a control resource set, CORESET, parameter and a search space parameter.

10. The downlink transmission method according to claim 7, wherein transmitting the downlink information to the terminal at the transmission starting time-frequency position comprises: transmitting the downlink information to the terminal through a physical downlink control channel (PDCCH) at the transmission starting time-frequency position.

11. The downlink transmission method according to claim 7, further comprising:

transmitting COT starting indication information to the terminal at a starting moment of the COT, wherein the COT starting indication information is used in determination of a target slot at the terminal;

or, transmitting downlink control information to the terminal, wherein a resource mapping type, which is indicated in a time-domain resource assignment indication within the downlink control information, corresponding to a physical downlink shared channel (PDSCH) is a second mapping type.

12. A downlink monitoring device, comprising a memory storing instructions and a processor in communication with the memory, wherein the processor is configured to execute the instruction to:

receive first semi-static configuration information transmitted by a base station, and determine a first monitoring opportunity strategy according to the first semi-static configuration information; or, receive second semi-static configuration information transmitted by a base station, and determine a second monitoring opportunity strategy according to the second semi-static configuration information;

receive a switching trigger; and switch, according to the switching trigger, a monitoring opportunity strategy for downlink monitoring from the first monitoring opportunity strategy which is currently used to the second monitoring opportunity strategy.

13. A downlink transmission device, comprising a memory storing instructions and a processor in communication with the memory, wherein the processor is configured to execute the instruction to perform the method according to claim 7.

14. The downlink monitoring method according to claim 1, wherein switching, by the terminal according to the switching trigger, the monitoring opportunity strategy for downlink monitoring from the first monitoring opportunity strategy which is currently used to the second monitoring opportunity strategy comprises:

stopping using the first monitoring opportunity strategy for downlink monitoring, and using the second monitoring opportunity strategy for the downlink monitoring.

15. The downlink monitoring method according to claim 1, wherein the switching trigger is indicated by a 1 bit flag in downlink control information, DCI, transmitted to the terminal, wherein the 1 bit flag is used to indicate to switch the monitoring opportunity strategy for the downlink monitoring.

16. The downlink monitoring method according to claim 1, wherein the first monitoring opportunity strategy is a common monitoring opportunity strategy and the second monitoring opportunity strategy is a target monitoring opportunity strategy; or,
  the first monitoring opportunity strategy is a target monitoring opportunity strategy and the second monitoring opportunity strategy is a common monitoring opportunity strategy;
  wherein a monitoring granularity of the target monitoring opportunity strategy is smaller than a monitoring granularity of the common monitoring opportunity strategy.

17. The downlink transmission method according to claim 7, wherein the switching trigger is used for:
  triggering the terminal to stop using the first monitoring opportunity strategy for downlink monitoring, and use the second monitoring opportunity strategy for downlink monitoring.

18. The downlink transmission method according to claim 7, wherein the switching trigger is indicated by a 1 bit flag in downlink control information, DCI, transmitted to the terminal, wherein the 1 bit flag is used to indicate to switch the monitoring opportunity strategy for the downlink monitoring.

19. The downlink transmission method according to claim 7, wherein
  the first monitoring opportunity strategy is a common monitoring opportunity strategy and the second monitoring opportunity strategy is a target monitoring opportunity strategy; or,
  the first monitoring opportunity strategy is a target monitoring opportunity strategy and the second monitoring opportunity strategy is a common monitoring opportunity strategy;
  wherein a monitoring granularity of the target monitoring opportunity strategy is smaller than a monitoring granularity of the common monitoring opportunity strategy.

* * * * *